(12) United States Patent
Li et al.

(10) Patent No.: US 10,136,140 B2
(45) Date of Patent: Nov. 20, 2018

(54) ENCODER-SIDE DECISIONS FOR SCREEN CONTENT ENCODING

(71) Applicant: Microsoft Technology Licensing, LLC, Redmond, WA (US)

(72) Inventors: Bin Li, Beijing (CN); Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/030,032

(22) PCT Filed: Mar. 17, 2014

(86) PCT No.: PCT/CN2014/073498
§ 371 (c)(1),
(2) Date: Apr. 15, 2016

(87) PCT Pub. No.: WO2015/139165
PCT Pub. Date: Sep. 24, 2015

(65) Prior Publication Data
US 2016/0269732 A1   Sep. 15, 2016

(51) Int. Cl.
*H04N 7/12* (2006.01)
*H04N 11/02* (2006.01)
(Continued)

(52) U.S. Cl.
CPC ........... *H04N 19/176* (2014.11); *H04N 19/11* (2014.11); *H04N 19/12* (2014.11); *H04N 19/136* (2014.11);
(Continued)

(58) Field of Classification Search
CPC ...... H04N 19/11; H04N 19/12; H04N 19/136; H04N 19/139; H04N 19/147;
(Continued)

(56) References Cited

U.S. PATENT DOCUMENTS 6,753,878 B1   6/2004 Heirich et al.
6,763,068 B2   7/2004 Oktem
(Continued)

FOREIGN PATENT DOCUMENTS

CN   1694533   11/2005
CN   102055977   5/2011
(Continued)

OTHER PUBLICATIONS

Communication Pursuant to Article 94(3) EPC dated Jan. 31, 2017, from European Patent Application No. 14886423.4, 7 pp.
(Continued)

*Primary Examiner* — Jessica M Prince
(74) *Attorney, Agent, or Firm* — Klarquist Sparkman, LLP

(57) ABSTRACT

Innovations in encoder-side decisions for coding of screen content video or other video can speed up encoding in various ways. For example, some of the innovations relate to ways to speed up motion estimation by identifying appropriate starting points for the motion estimation in different reference pictures. Many of the encoder-side decisions speed up encoding by terminating encoding for a block or skipping the evaluation of certain modes or options when a condition is satisfied. For example, some of the innovations relate to ways to speed up encoding when hash-based block matching is used. Still other innovations relate to ways to identify when certain intra-picture prediction modes should or should not be evaluated during encoding. Other innovations relate to other aspects of encoding.

20 Claims, 16 Drawing Sheets

(51) Int. Cl.

| | | |
|---|---|---|
| *H04N 11/04* | (2006.01) | |
| *H04N 19/176* | (2014.01) | |
| *H04N 19/593* | (2014.01) | |
| *H04N 19/537* | (2014.01) | |
| *H04N 19/567* | (2014.01) | |
| *H04N 19/56* | (2014.01) | |
| *H04N 19/147* | (2014.01) | |
| *H04N 19/11* | (2014.01) | |
| *H04N 19/12* | (2014.01) | |
| *H04N 19/136* | (2014.01) | |
| *H04N 19/186* | (2014.01) | |
| *H04N 19/154* | (2014.01) | |
| *H04N 19/523* | (2014.01) | |
| *H04N 19/557* | (2014.01) | |
| *H04N 19/139* | (2014.01) | |
| *H04N 19/187* | (2014.01) | |
| *H04N 19/51* | (2014.01) | |
| *H04N 19/82* | (2014.01) | |

(52) U.S. Cl.
CPC ......... *H04N 19/139* (2014.11); *H04N 19/147* (2014.11); *H04N 19/154* (2014.11); *H04N 19/186* (2014.11); *H04N 19/187* (2014.11); *H04N 19/51* (2014.11); *H04N 19/523* (2014.11); *H04N 19/537* (2014.11); *H04N 19/557* (2014.11); *H04N 19/56* (2014.11); *H04N 19/567* (2014.11); *H04N 19/593* (2014.11); *H04N 19/82* (2014.11)

(58) Field of Classification Search
CPC .. H04N 19/154; H04N 19/176; H04N 19/186; H04N 19/187; H04N 19/51; H04N 19/523; H04N 19/537; H04N 19/557; H04N 19/56; H04N 19/05
See application file for complete search history.

(56) References Cited

U.S. PATENT DOCUMENTS

| | | | |
|---|---|---|---|
| 7,260,148 B2 | 8/2007 | Sohm | |
| 7,580,456 B2 | 8/2009 | Li et al. | |
| 7,733,380 B1 | 6/2010 | Cote et al. | |
| 7,764,738 B2 | 7/2010 | Kim et al. | |
| 7,843,995 B2 | 11/2010 | Bhaskaran et al. | |
| 7,903,733 B2 | 3/2011 | Panda et al. | |
| 8,254,455 B2 | 8/2012 | Wu et al. | |
| 8,270,467 B1 | 9/2012 | Wang | |
| 8,295,356 B2 | 10/2012 | He et al. | |
| 8,331,449 B2 | 12/2012 | Kim et al. | |
| 8,335,255 B2 | 12/2012 | Lee et al. | |
| 8,379,728 B2 | 2/2013 | Katzur et al. | |
| 8,379,996 B2 | 2/2013 | Murata et al. | |
| 8,428,373 B2 | 4/2013 | Jeon et al. | |
| 8,457,202 B2 | 6/2013 | Wang et al. | |
| 8,467,448 B2 | 6/2013 | Hsiang et al. | |
| 8,514,933 B2 | 8/2013 | Liang et al. | |
| 8,693,551 B2 | 4/2014 | Zheludkov et al. | |
| 8,737,477 B2 | 5/2014 | Du La et al. | |
| 8,743,949 B2 | 6/2014 | Srinivasan et al. | |
| 8,804,836 B2 | 8/2014 | Nilsson et al. | |
| 9,137,544 B2 | 9/2015 | Lin et al. | |
| 9,219,915 B1 | 12/2015 | Bultje et al. | |
| 2002/0025001 A1* | 2/2002 | Ismaeil | H04N 19/56 375/240.16 |
| 2003/0156648 A1 | 8/2003 | Holcomb et al. | |
| 2004/0264575 A1 | 12/2004 | Bjontegaard | |
| 2005/0069211 A1 | 3/2005 | Lee et al. | |
| 2005/0084012 A1 | 4/2005 | Hsu et al. | |
| 2005/0207497 A1 | 9/2005 | Rovati et al. | |
| 2006/0098738 A1 | 5/2006 | Cosman et al. | |
| 2006/0164543 A1 | 7/2006 | Richardson et al. | |
| 2007/0030894 A1 | 2/2007 | Tian et al. | |
| 2007/0031051 A1 | 2/2007 | Lee et al. | |
| 2007/0140344 A1 | 6/2007 | Shima | |
| 2007/0177668 A1 | 8/2007 | Park | |
| 2007/0263720 A1 | 11/2007 | He | |
| 2007/0274396 A1 | 11/2007 | Zhang et al. | |
| 2008/0279466 A1 | 11/2008 | Yang | |
| 2009/0073005 A1 | 3/2009 | Normile et al. | |
| 2009/0129472 A1* | 5/2009 | Panusopone | H04N 19/56 375/240.16 |
| 2009/0168878 A1 | 7/2009 | Kawashima | |
| 2009/0190660 A1 | 7/2009 | Kusakabe et al. | |
| 2009/0245353 A1 | 10/2009 | Choi et al. | |
| 2009/0290641 A1 | 11/2009 | Crinon et al. | |
| 2010/0020872 A1 | 1/2010 | Shimizu et al. | |
| 2010/0061447 A1 | 3/2010 | Tu et al. | |
| 2010/0074338 A1 | 3/2010 | Yamori | |
| 2010/0150253 A1 | 6/2010 | Kuo et al. | |
| 2010/0189179 A1 | 7/2010 | Gu et al. | |
| 2010/0215104 A1 | 8/2010 | Osamoto et al. | |
| 2010/0246684 A1 | 9/2010 | Naito et al. | |
| 2010/0260271 A1 | 10/2010 | Kapoor | |
| 2010/0290521 A1 | 11/2010 | Liu et al. | |
| 2011/0013700 A1 | 1/2011 | Kim | |
| 2011/0051813 A1 | 3/2011 | Krishnan et al. | |
| 2011/0109753 A1 | 5/2011 | Srinivasamurthy et al. | |
| 2011/0142134 A1 | 6/2011 | Wahadaniah | |
| 2011/0164677 A1 | 7/2011 | Lu et al. | |
| 2011/0200264 A1 | 8/2011 | Park | |
| 2011/0243225 A1 | 10/2011 | Min et al. | |
| 2011/0268187 A1 | 11/2011 | Lamy-Bergot et al. | |
| 2011/0274357 A1 | 11/2011 | Iwamoto et al. | |
| 2011/0286520 A1 | 11/2011 | Xu et al. | |
| 2011/0292998 A1 | 12/2011 | Ohgose et al. | |
| 2012/0195366 A1 | 8/2012 | Liu et al. | |
| 2012/0200663 A1 | 8/2012 | Sievers et al. | |
| 2012/0281760 A1 | 11/2012 | Kim | |
| 2013/0003838 A1 | 1/2013 | Gao et al. | |
| 2013/0003860 A1 | 1/2013 | Sasai et al. | |
| 2013/0016777 A1 | 1/2013 | Gao et al. | |
| 2013/0021483 A1 | 1/2013 | Bennett et al. | |
| 2013/0028317 A1 | 1/2013 | Parfenov et al. | |
| 2013/0089143 A1 | 4/2013 | Siddaramanna et al. | |
| 2013/0114696 A1 | 5/2013 | Liu | |
| 2013/0114730 A1 | 5/2013 | Joshi et al. | |
| 2013/0121401 A1 | 5/2013 | Zheludkov et al. | |
| 2013/0128952 A1 | 5/2013 | Kwon et al. | |
| 2013/0128964 A1 | 5/2013 | Chien et al. | |
| 2013/0216149 A1 | 8/2013 | Sato | |
| 2013/0230098 A1 | 9/2013 | Song et al. | |
| 2013/0266073 A1 | 10/2013 | Macinnis et al. | |
| 2013/0272389 A1 | 10/2013 | Sze et al. | |
| 2013/0308696 A1 | 11/2013 | Kim et al. | |
| 2013/0343462 A1 | 12/2013 | Li et al. | |
| 2013/0343464 A1 | 12/2013 | Van der Auwera et al. | |
| 2014/0064359 A1 | 3/2014 | Rapaka et al. | |
| 2014/0079133 A1 | 3/2014 | Sato | |
| 2014/0219331 A1 | 8/2014 | Pai | |
| 2014/0219342 A1 | 8/2014 | Yu et al. | |
| 2014/0219349 A1 | 8/2014 | Chien et al. | |
| 2014/0226713 A1 | 8/2014 | Perlman et al. | |
| 2014/0229186 A1 | 8/2014 | Mehrotra et al. | |
| 2014/0241420 A1 | 8/2014 | Orton-Jay et al. | |
| 2014/0254676 A1 | 9/2014 | Jiang et al. | |
| 2014/0269919 A1* | 9/2014 | Rodriguez | H04N 19/513 375/240.16 |
| 2014/0301465 A1 | 10/2014 | Kwon et al. | |
| 2014/0369413 A1* | 12/2014 | Clark | H04N 19/94 375/240.16 |
| 2015/0098500 A1 | 4/2015 | Oh et al. | |
| 2015/0189269 A1 | 7/2015 | Han et al. | |
| 2015/0271510 A1 | 9/2015 | Wen et al. | |
| 2016/0094855 A1 | 3/2016 | Zhou | |

FOREIGN PATENT DOCUMENTS

| | | |
|---|---|---|
| CN | 102148989 | 8/2011 |
| CN | 102665078 | 9/2012 |
| CN | 103118262 | 5/2013 |

(56) References Cited

FOREIGN PATENT DOCUMENTS

| | | |
|---|---|---|
| CN | 103248895 | 8/2013 |
| CN | 103281538 | 9/2013 |
| CN | 103384327 | 11/2013 |
| CN | 103533325 | 1/2014 |
| CN | 103763570 | 4/2014 |
| EP | 1369820 | 12/2003 |
| EP | 1603338 | 12/2005 |
| EP | 1761069 | 3/2007 |
| EP | 2618572 | 7/2013 |
| JP | 2003-244696 | 8/2003 |
| WO | WO 2004/080084 | 9/2004 |
| WO | WO 2012/071949 | 6/2012 |
| WO | WO 2013/028580 | 2/2013 |
| WO | WO 2013/143103 | 10/2013 |
| WO | WO 2013/181821 | 12/2013 |
| WO | WO 2014/083491 | 6/2014 |

OTHER PUBLICATIONS

Lin et al., "CE6 Subset 5.2.2 and 6.2.2: Intra Coding Improvements," JCTVC-H0057, 6 pp. (Feb. 2012).
Tabatabai et al., "Core Experiment 6: Intra Prediction Improvement," JCTVC-D606_r1, 13 pp. (Jan. 2011).
Zhang et al., "Improved Intra Prediction Mode-decision Method," *Visual Communications and Image Processing*, vol. 5960, pp. 632-646 (Jul. 2005).
Kim et al., "Fast Coding Unit Size Decision Algorithm for Infra Coding in HEVC," *IEEE Int'l Conf. on Consumer Electronics*, pp. 637-638 (Jan. 2013).
Shen et al., "Fast Coding Unit Size Selection for HEVC Based on Bayesian Decision Rule," *Picture Coding Symp.*, pp. 453-456 (May 2012).
Shen et al., "Fast CU Size Decision and Mode Decision Algorithm for HEVC Intra Coding," *IEEE Trans. On Consumer Electronics*, vol. 59, No. 1, pp. 207-213 (Feb. 2013).
Al et al., "Quality and Complexity Comparison of H.264 Intra Mode with JPEG2000 and JPEG," *IEEE Int'l Conf. on Image Processing*, vol. 1, pp. 525-528 (Oct. 2004).
Armbrust, "Capturing Growth: Photo Apps and Open Graph," 8 pp., downloaded from https://developers.facebook.com/blog/post/2012/07/17/capturing-growth--photo-apps-and-open-graph/ (Jul. 17, 2012).
BenHajyoussef et al., "Fast Gradient Based Intra Mode Decision for High Efficiency Video Coding," *Int'l Journal of Emerging Trends& Technology in Computer Science*, vol. 3, Issue 3, pp. 223-228 (May 2014).
Bjontegaard, "Calculation of Average PSNR Differences Between RD-curves," ITU-T VCEG-M33, 4 pp. (Apr. 2001).
Bross et al., "High Efficiency Video Coding (HEVC) Text Specification draft 8," JCTVC-J1003_d7, 260 pp. (Jul. 2012).
Ding et al., "Enable Efficient Compound Image Compression in H.264/AVC Infra Coding," *IEEE Int'l Conf on Image Processing*, vol. 2, pp. 337-340 (Sep. 2007).
Flynn et al., "High Efficiency Video Coding (HEVC) Range Extensions text specification: Draft 6," JCTVC-P1005_v1, 355 pp. (Jan. 2014).
Fritts et al., "Fast Intra-Prediction Mode Selection for H.264," Powerpoint, presentation, downloaded from the World Wide Web, 23 pp. (downloaded on Apr. 17, 2015—document not dated).
Gabriellini et al., "Adaptive Transform Skipping for Improved Coding of Motion Compensated Residuals," BBC Research & Development White Paper, WHP 246, 22 pp. (Mar. 2013).
Gan et al., "Novel multi-frame fast motion search algorithm based on H.264," *Journal on Communications*, vol. 28, No. 1, pp. 17-21 (Jan. 2007).
"How VP9 works, technical details & diagrams," downloaded from the World Wide Web, 12 pp. (document marked Oct. 2013).
Hsu et al., "Fast Coding Unit Decision Algorithm for HEVC," Signal and Information Processing Association Annual Summit and Conf., 5 pp. (Oct. 2013).

Hu et al., "Fast Inter-Mode Decision Based on Rate-Distortion Cost Characteristics," *Proc. of the Advances in Multimedia Information Processing and 11th Pacific Rim Conf. on Multimedia*, pp. 145-155 (Sep. 2010).
International Search Report and Written Opinion dated Dec. 22, 2014, from International Patent Application No. PCT/CN2014/073498, 18 pp.
Jiang et al., "Gradient Based Fast Mode Decision Algorithm for Intra Prediction in HEVC," *Int'l Conf. on Consumer Electronics, Communications and Networks*, pp. 1836-1840 (Jan. 2012).
Khan et al., "Fast Hierarchical Intra Angular Mode Selection for High Efficiency Video Coding," *Proc. Int'l Conf. on Image Processing*, 5 pp. (Oct. 2014).
Kim et al., "A Fast Intra Mode Skip Decision Algorithm Based on Adaptive Motion Vector Map," *Digest of Technical Papers Int'l Conf. on Consumer Electronics*, 2 pp. (Jan. 2009).
Kim et al., "Fast Intra/Inter Mode Decision for H.264 Encoding Using a Risk-Minimization Criterion," *SPIE Proc., Applications of Digital Image Process*, vol. 5558, 11 pp. (Nov. 2004).
Kim et al., "Fast Intra Mode Decision of HEVC Based on Hierarchical Structure," *Proc. 8th Int'l Conf. on Information, Communications, and Signal Processing*, 4 pp. (Dec. 2011).
Kim et al., "Fast Skip Mode Decision with Rate-Distortion Optimization for High Efficiency Video Coding," *IEEE Int'l Conf. on Multimedia and Expo Workshops*, 6 pp. (Jul. 2014).
Kim et al., "TE9-1 Report on Performance Tests for Different CTU and TU Sizes," JCTVC-0067, 13 pp. (Oct. 2010).
Lan et al., "Compress Compound Images in H.264/MPEG-4 AVC by Exploiting Spatial Correlation," *IEEE Trans. on Image Processing*, vol. 19, No. 4, pp. 946-957 (Apr. 2010).
Lan et al., "Intra transform skipping," JCTVC-I0408, 11 pp. (May 2012).
Lee et al., "Early termination of transform skip mode for High Efficiency Video coding," *Int'l Conf on Communications, Signal Processing and Computers*, pp. 177-181 (Feb. 2014).
Lee et al., "Fast Direct Mode Decision Algorithm based on Optimal Mode Pattern Searching," *Int'l Journal of Multimedia and Ubiquitous Engineering*, vol. 7, No. 2, pp. 415-420 (Apr. 2012).
Lei et al., "Fast Intra Prediction Mode Decision for High Efficiency Video Coding," *Int'l Symp. on Computer, Communication, Control and Automation*, pp. 34-37 (Nov. 2013).
Li et al., "Description of screen content coding technology proposal by Microsoft," JCTVC-Q0035, 27 pp. (Mar. 2014).
Li et al., "Low complexity encoders for JCTVC-Q0035," JCTVC-Q0052, 4 pp. (Mar. 2014).
Liang et al., "A Light-Weight HEVC Encoder for Image Coding," *Visual Communications and Image Processing*, 5 pp. (Nov. 2013).
Liao et al., "Rate-Distortion Cost Estimation for H.264/AVC," *IEEE Trans. on Circuits and Systems for Video Technology*, vol. 20, No. 1, pp. 38-49 (Jan. 2010).
Lin et al., "Fast Mode Decision for H.264 Based on Rate-Distortion Cost Estimation," *IEEE Int'l Conf on Acoustics, Speech and Signal Processing*, vol. 1, 4 pp. (Apr. 2007).
Ma et al., "Rate Distortion Cost Modeling of Skip Mode and Early Skip Mode Selection for H.264," *SPIE Proc., Visual Communications and Image Processing*, vol. 7257, 4 pp. (Jan. 2009).
Mrak et al., "Improving Screen Content Coding in HEVC by Transform Skipping," *20th European Signal Processing Conf.*, pp. 1209-1213 (Aug. 2012).
Nguyen et al., "Performance Analysis of HEVC-based Intra Coding for Still Image Compression," *Picture Coding Symposium*, pp. 233-236 (May 2012).
Pan et al., "Content Adaptive Frame Skipping for Low Bit Rate Video Coding," *Int'l Conf. on Information, Communications and Signal Processing*, pp. 230-234 (Dec. 2003).
Panusopone et al., "Evaluation of RQT in HM and Related TU Representation," JCTVC-E365, 9 pp. (Mar. 2011).
Panusopone et al., "Evaluation of RQT in HM and Related TU Representation," JCTVC-E365 slideshow, 9 pp. (Mar. 2011).
Piao et al., "Encoder Improvement of Unified Intra Prediction," JCTVC-C207, 5 pp. (Oct. 2010).

(56) References Cited

OTHER PUBLICATIONS

Rhee et al., "A Survey of Fast Mode Decision Algorithms for Inter-Prediction and Their Applications to High Efficiency Video Coding," *IEEE Trans. on Consumer Electronics*, vol. 58, No. 4, pp. 1375-1383 (Nov. 2012).
Richardson et al., "Fast H.264 Skip Mode Selection Using an Estimation Framework," *Proc. of Picture Coding Symp.*, 5 pp. (Apr. 2006).
Sharabayko et al., "Research on H.265/HEVC Intra Prediction Modes Selection Frequencies," *Int'l Conf. for Students and Young Scientists*, 3 pp. (Apr. 2014).
Shen et al., "Adaptive Transform Size Decision Algorithm for High-Efficiency Video Coding Inter Coding," *Journal of Electronic Imaging*, vol. 23, Issue 4, 9 pp. (Aug. 2014).
Shen et al., "CU Splitting Early Termination Based on Weighted SVM," *EURASIP Journal on Image and Video Processing*, 8 pp. (Jan. 2013).
Shen et al., "Effective CU Size Decision for HEVC Intracoding," *IEEE Trans. on Image Processing*, vol. 23, No. 10, pp. 4232-4241 (Oct. 2014).
Smith, "Ooh! Aah! Google Images Presents a Nicer Way to Surf the Visual Web," 4 pp., downloaded from http://googleblog.blogspot.com/2010/07/ooh-ahh-google-images-presents-nicer.html (Jul. 20, 2010).
Tagliasacchi et al., "Hash-Based Motion Modeling in Wyner-Ziv Video Coding," *IEEE Int'l Conf. on Acoustics, Speec and Signal Processing*, vol. 1, pp. 509-512 (Apr. 2007).
Teng et al., "Fast Mode Decision Algorithm for Residual Quadtree Coding in HEVC," *IEEE Visual Communications and Image Processing*, 4 pp. (Nov. 2011).
Tian et al., "Content Adaptive Prediction Unit Size Decision Algorithm for HEVC Intra Coding," *Picture Coding Symp.*, 4 pp. (May 2012).
Vanam, "Motion Estimation and Intra Frame Prediction in H.264/AVC Encoder," Powerpoint presentation, downloaded from the World Wide Web, 31 pp. (Nov. 2013).
Wang et al., "An Efficient Mode Decision Algorithm for H.264/AVC Encoding Optimization," *IEEE Trans. on Multimedia*, vol. 9, No. 4, pp. 882-888 (Jun. 2007).
Wang et al., "An Effective TU Size Decision Method for Fast HEVC Encoders," *Int'l Symp. on Computer, Consumer and Control*, 4 pp. (Jun. 2014).
Wang et al., "Prediction of Zero Quantized DCT Coefficients in H.264/AVC Using Hadamard Transformed Information," *IEEE Trans. on Circuits and Systems for Video Technology*, vol. 18, No. 4, pp. 510-515 (Apr. 2008).
Wei et al., "A Fast Macroblock Mode Decision Algorithm for H.264," *IEEE Asia Pacific Conf on Circuits and Systems*, pp. 772-775 (Dec. 2006).
Wiegand et al., "Draft ITU-T Recommendation and Final Draft International Standard of Joint Video Specification (ITU-T Rec. H.264 | ISO/IEC 14496-10 AVC)," JVT-G050r1, 269 pp. (May 2003).
Won et al., "Transform skip based on minimum TU size," JCTVC-N0167, 10 pp. (Aug. 2013).
Xin et al., "Fast Inter Prediction Block Mode Decision Approach for H.264/AVC Based on All-Zero Blocks Detection," *IEEE Conf. on Industrial Electronics and Applications*, pp. 896-899 (Jun. 2013).
Yu et al., "Early Termination of Coding Unit Splitting for HEVC," *Asia-Pacific Signal & Information Processing Association Annual Summit and Conf.*, 4 pp. (Dec. 2012).
Zhang et al., "Early Termination Schemes for Fast Intra Mode Decision in High Efficiency Video Coding," *IEEE Int'l Symp. on Circuits and Systems*, pp. 45-48 (May 2013).
Zhang et al., "Fast Intra Prediction for High Efficiency Video Coding," *Proc. 13th Pacific Rim Conf. on Advances in Multimedia Information Processing*, 10 pp. (Dec. 2012).
Zhao et al., "Further Encoder Improvement of Intra Mode Decision," JCTVC-D283, 4 pp. (Jan. 2011).
Zhao et al., "Further Encoder Improvement of Intra Mode Decision," JCTVC-D283 slideshow, 14 pp. (Jan. 2011).
Chang et al., "A Two Level Mode Decision Algorithm for H.264 High Profile Intra Encoding," *IEEE Int'l Symp. On Circuits and Systems*, pp. 508-511 (May 2012).
Chen et al., "Fast Integer Pel and Fractional Pel Motion Estimation for AVC," ISO/IEC MPEG 2002/M9117, 16 pp. (Nov. 2002).
Chen et al., "Fast Motion Estimation for JVT," JVT-G016, 12 pp. (Mar. 2003).
Deng et al., "Fast Mode Decision Algorithm for Inter-Layer Intra Prediction in SVC," *IEEE Int'l Conf. on Broadband Network and Multimedia Technology*, pp. 212-216 (Oct. 2011).
Do et al., "An Early Block Type Decision Method for Intra Prediction in H.264/AVC," *IEEE Workshop on Signal Processing Systems*, pp. 97-101 (Oct. 2009).
Hu et al., "Analysis and Optimization of x265 Encoder," *IEEE Visual Communications and Image Processing Conf.*, pp. 502-505 (Dec. 2014).
International Preliminary Report on Patentability dated Sep. 29, 2016, from International Patent Application No. PCT/CN2014/073498, 10 pp.
Kibeya et al., "A Fast Coding Algorithm Based on Fast Mode Decision for HEVC Standard," *IEEE Int'l Conf. on Sciences and Techniques of Automatic Control & Computer Engineering*, pp. 158-163 (Dec. 2013).
Kim et al., "A Fast Intra Mode Skip Decision Algorithm Based on Adaptive Motion Vector Map," *IEEE Trans. on Consumer Electronics*, vol. 55, No. 1, pp. 179-184 (Feb. 2009).
Kim et al., "A Fast Intra Skip Detection Algorithm for H.264/AVC Video Encoding," *ETRI Journal*, vol. 28, No. 6, pp. 721-731 (Dec. 2006).
Kim et al., "An Efficient and Fast Block Size Decision Exploiting Boundary Information of Inner Block for H.264/AVC Intra Prediction," *IEEE Southwest Symp. On Image Analysis and Interpretation*, pp. 101-104 (Mar. 2008).
Kim et al., "Block Partitioning Structure in the HEVC Standard," *IEEE Trans. On Circuits and Systems for Video Technology*, vol. 22, No. 12, pp. 1697-1706 (Dec. 2012).
Kim et al., "Efficient Intra-mode Decision Algorithm for Inter-frames in H.264/AVC Video Coding," *IET Image Processing*, vol. 5, No. 3, pp. 286-295 (Apr. 2011).
Sun et al., "An Efficient Multi-Frame Dynamic Search Range Motion Estimation for H.264," *Visual Communications and Image Processing*, vol. 6508, 10 pp. (Jan. 2007).
Supplementary European Search Report dated Jan. 4, 2017, from European Patent Application No. 14886423.4, 4 pp.
U et al., "An Early Intra Mode Skipping Technique for Inter Frame Coding in H.264 BP," *Digest of Technical Papers, Int'l Conf. on Consumer Electronic*, 2 pp. (Jan. 2007).
Wang et al., "An Efficient Infra Skip Decision Algorithm for H.264/AVC Video Coding," *Journal of Applied Science and Engineering*, vol. 17, No. 3, pp. 329-339 (May 2014).
Bhaskaranand et al., "Low-complexity Video Encoding for UAV Reconnaissance and Surveillance," Proc. of Military Communications Conference, 6 pp. (Nov. 2011).
Fernando et al., "DFD Based Segmentation for H.263 Video Sequences," *IEEE Int'l Symp. On Circuits and Systems*, vol. 4, pp. 520-523 (May 1999).
Gardos et al., "Video Codec Test Model, Near-Term, Version 8 (TMN8)," ITU Study Group 16, Document Q15-A-59, 56 pp. (Jun. 1997).
Huade et al., "A Fast CU Size Decision Algorithm Based on Adaptive Depth Selection for HEVC Encoder," *IEEE Intl Conf. on Audio, Language and Image Processing*, pp. 143-146 (Jul. 2014).
Microsoft Corporation, "Codec API Properties," downloaded from the World Wide Web, 10 pp. (downloaded on Apr. 17, 2015).
Microsoft Corporation, "H.264 Video Encoder," downloaded from the World Wide Web, 8 pp. (downloaded on Apr. 17, 2015).
Microsoft Corporation, "ICodecAPI Interface," downloaded from the World Wide Web, 3 pp. (downloaded on Apr. 17, 2015).
Microsoft Corporation, "IMFSample Interface," downloaded from the World Wide Web, 3 pp. (downloaded on Apr. 17, 2015).

(56) References Cited

OTHER PUBLICATIONS

Microsoft Corporation, "IMFTransform Interface," downloaded from the World Wide Web, 3 pp. (downloaded on Apr. 17, 2015).

Microsoft Corporation, "Sample Attributes," downloaded from the World Wide Web, 3 pp. (downloaded on Apr. 17, 2015).

Notice on the First Office Action dated Jan. 2, 2018, from Chinese Patent Application No. 201480037981.5, 14 pp.

Rodriguez et al., "Using Telemetry Data for Video Compression on Unmanned Air Vehicles," *AIAA Guidance, Navigation and Control Conference*, 8 pp. (Aug. 2006).

Sullivan et al., "The H.264/AVC Advanced Video Coding Standard: Overview and Introduction to the Fidelity Range Extensions," *SPIE Conf. on Applications of Digital Image Processing*, vol. 5558, pp. 454-474 (Aug. 2004).

Usach-Molina et al., "Content-Based Dynamic Threshold Method for Real-Time Keyframe Selecting," *IEEE Trans. On Circuits and Systems for Video Technology*, vol. 20, No. 7, pp. 982-993 (Jul. 2010).

\* cited by examiner software 180 implementing one or more innovations
for encoder-side decisions for screen content coding

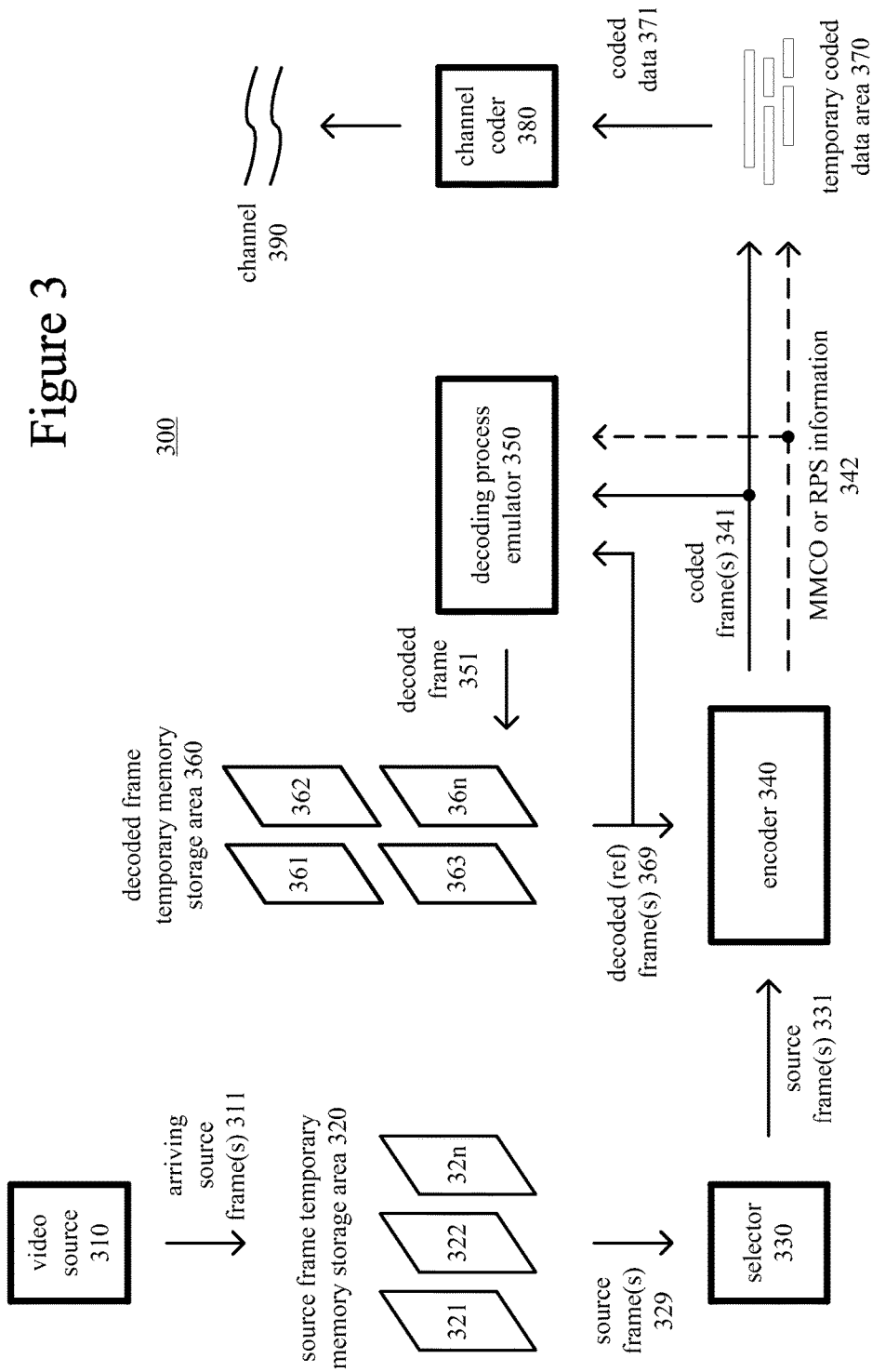

400

Figure 5
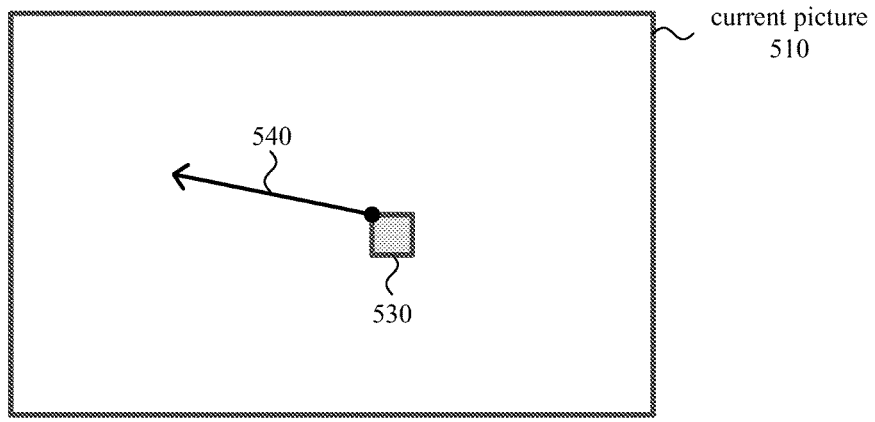
MV value (540) for current block (530) of current picture (510), indicating a displacement to a reference block in reference picture (550)
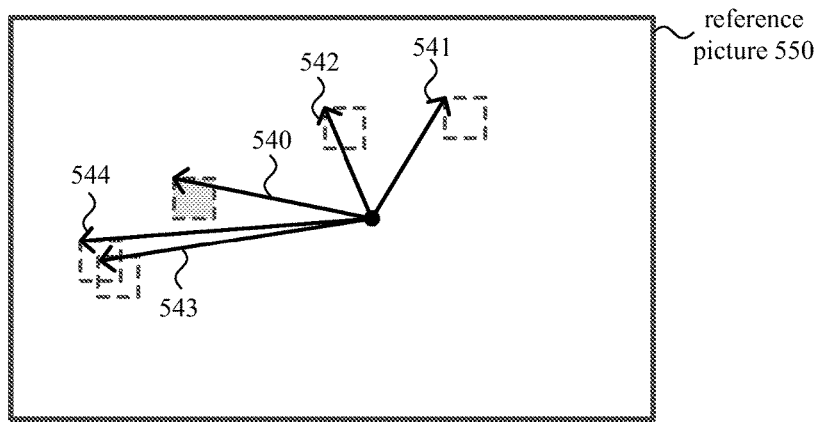
MV values (541, 542, 543, 544) indicating displacements to candidate blocks in the reference picture (550), relative to coordinates of top-left corner of the current block (530)

Figure 6
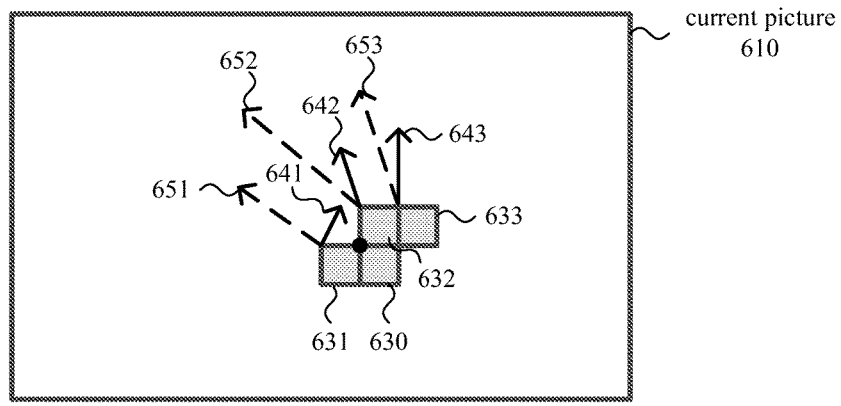
current picture 610
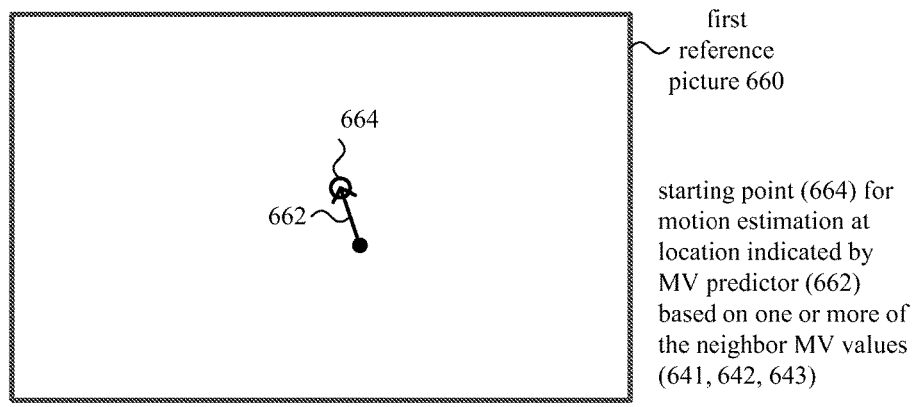
first reference picture 660
starting point (664) for motion estimation at location indicated by MV predictor (662) based on one or more of the neighbor MV values (641, 642, 643)
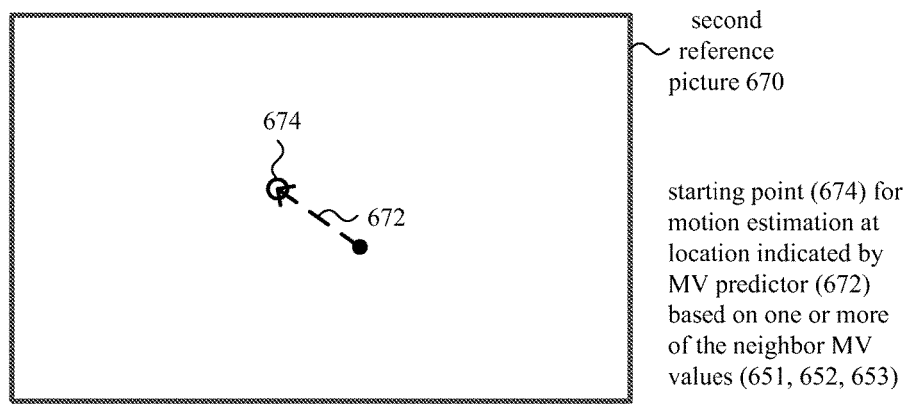
second reference picture 670
starting point (674) for motion estimation at location indicated by MV predictor (672) based on one or more of the neighbor MV values (651, 652, 653)

block vector (940) for current block (930) of current picture (910), indicating a displacement to a reference region (950) in the current picture (910)

block vectors (1041, 1042, 1043, 1044) indicating displacements to candidate blocks for current block (1030) of current picture (1010)

Figure 11   1100            $h(B_{current}) = h_3$ $h_0$:   $B(1266, 263), B(1357, 365), B(1429, 401), B(502, 464), \ldots$ $h_1$:   $B(1704, 154), B(1709, 177), B(1158, 242)$ $h_2$:   $B(1321, 49), B(145, 182), B(599, 490), B(1668, 511), \ldots$ $h_3$:   $B(569, 73), B(1293, 102), B(401, 290), B(455, 306), \ldots$ $h_4$:   $B(1119, 46)$ $h_5$:   $B(1381, 11), B(1676, 53), B(38, 119), B(1633, 184), \ldots$ $h_6$:   $B(979, 85), B(1013, 177), B(575, 470), B(900, 477), \ldots$

.
.
.

$h_{n-1}$:   $B(794, 14), B(1479, 17), B(19, 317), B(1338, 374), \ldots$

Figure 12a  1200

$h_0$:    entry(0, 0), entry(0, 1), entry(0, 2), entry(0, 3), ...

$h_1$:    entry(1, 0), entry(1, 1), entry(1, 2), entry(1, 3), ...

$h_2$:

$h_3$:    entry(3, 0), entry(3, 1), entry(3, 2), entry(3, 3)

$h_4$:    entry(4, 0), entry(4, 1), entry(4, 2), entry(4, 3), ...

$h_5$:    entry(5, 0), entry(5, 1), entry(5, 2), entry(5, 3), ...

$h_6$:    entry(6, 0), entry(6, 1)

.
.
.

$h_{n-1}$:    entry(n-1, 0), entry(n-1, 1), entry(n-1, 2), entry(n-1, 3), ...

Figure 12b  1210

*entry($h_i$, k)* :    address of *B*

Figure 12c  1220

*entry($h_i$, k)* :    address of *B* and hash value *h'(B)* from $2^{nd}$ hash function *h'()*

Figure 13a   1300                    $h(B_{current}) = h_2$ $h_0$ :    $h'_0$ list, $h'_1$ list, $h'_2$ list, $h'_3$ list, ...

$h_1$ :    $h'_0$ list, $h'_1$ list, $h'_2$ list, $h'_3$ list, ...

$h_2$ :    $h'_0$ list, $h'_1$ list, $h'_2$ list, $h'_3$ list, ...

$h_3$ :    $h'_0$ list, $h'_1$ list, $h'_2$ list, $h'_3$ list, ...

.
.
.

$h_{n1-1}$ :    $h'_0$ list, $h'_1$ list, $h'_2$ list, $h'_3$ list, ...

Figure 13b   1310                    $h'(B_{current}) = h'_0$ $h'_0$ :    entry(0, 0), entry(0, 1), entry(0, 2), entry(0, 3), ...

$h'_1$ :    entry(1, 0), entry(1, 1), entry(1, 2), entry(1, 3), ...

$h'_2$ :

$h'_3$ :    entry(3, 0), entry(3, 1), entry(3, 2), entry(3, 3)

.
.
.

$h'_{n2-1}$ :    entry(n2-1, 0), entry(n2-1, 1), entry(n2-1, 2), ...

Figure 13c   1320

*entry($h'_i$, k)* :    address of *B* block 1610 of natural video block 1620 of screen capture video

Figure 18                                  1800
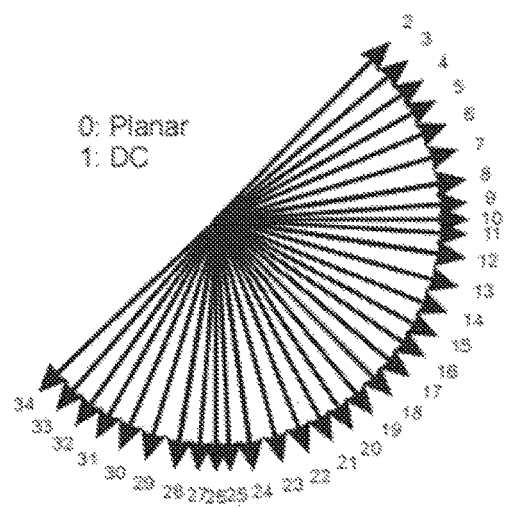
Figure 19
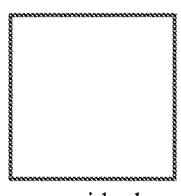 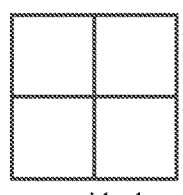 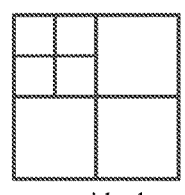 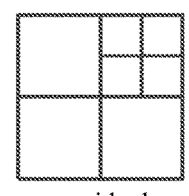
residual quadtree 1901    residual quadtree 1902    residual quadtree 1903    residual quadtree 1904
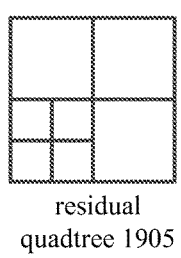 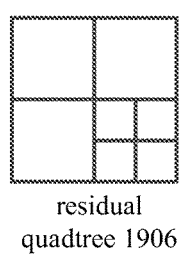 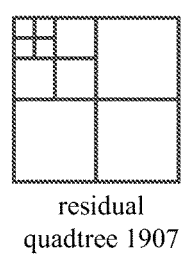 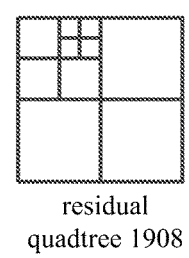
residual quadtree 1905    residual quadtree 1906    residual quadtree 1907    residual quadtree 1908
• • •

ENCODER-SIDE DECISIONS FOR SCREEN CONTENT ENCODING

CROSS REFERENCE TO RELATED APPLICATIONS

This is the U.S. National Stage of International Application No. PCT/CN2014/073498, filed Mar. 17, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

As currently implemented in some reference software for the H.265/HEVC standard (and extensions thereof), encoder-side decisions are not made effectively in various situations, especially with respect to coding modes and options for screen content video.

SUMMARY

In summary, the detailed description presents innovations in encoder-side decisions for coding of screen content video or other video. For example, some of the innovations relate to ways to speed up motion estimation by identifying appropriate starting points for the motion estimation in different reference pictures. Other innovations relate to ways to speed up encoding when hash-based block matching is used. Still other innovations relate to ways to identify when certain intra-picture prediction modes should or should not be evaluated during encoding, which can speed up encoding. Other innovations relate to other aspects of encoding.

According to a first aspect of the innovations described herein, during encoding of video, a video encoder performs motion estimation for a current block of a current picture to select a motion vector ("MV") value for the current block. As part of the motion estimation, the video encoder evaluates one or more candidate MV values in each of multiple reference pictures. For each of the multiple reference pictures, the video encoder determines a starting point for the motion estimation using only one or more MV values of previously coded blocks that use that reference picture (that is, not using any MV values of previously coded blocks that use any other reference picture). For example, the encoder determines an MV predictor from the MV value(s) of previously coded blocks that use the reference picture, then uses a location indicated by the MV predictor as the starting point for the motion estimation in that reference picture. The video encoder encodes the current block using the MV value for the current block.

According to another aspect of the innovations described herein, during encoding of an image or video, an encoder performs hash-based block matching for a current block of a current picture. Based on whether a condition is satisfied, the encoder determines whether to skip one or more stages of encoding for the current block. The condition depends on whether a match is found during the hash-based block matching for the current block. The condition can also depend on other factors (e.g., expected quality of the current block relative to quality of a candidate block for the match and/or block size of the current block relative to a threshold block size). Based on results of the determining, the encoder selectively skips the stage(s) of encoding for the current block.

For example, the hash-based block matching for the current block is performed for motion estimation, and the potentially skipped stage(s) of encoding include fractional-precision motion estimation for the current block or evaluation of coding modes and coding options for the current block. Or, the hash-based block matching for the current block is performed for block vector estimation, and the potentially skipped stage(s) of encoding include evaluation of intra-picture coding modes and coding options for the current block.

According to another aspect of the innovations described herein, during encoding of an image or video, an encoder measures the number of different colors in a unit (e.g., block, slice, picture) of the image or video. Based at least in part on results of the measuring, the encoder determines whether to skip one or more intra-picture prediction modes (e.g., intra block copy ("BC") prediction and/or dictionary coding mode) for the unit. For example, the encoder compares the results of the measuring to a threshold. If the intra-picture prediction mode(s) are not skipped for the unit, the encoder evaluates the intra-picture prediction mode(s) for the unit.

According to another aspect of the innovations described herein, during encoding of an image or video, an encoder identifies a set of candidate directions of spatial intra-picture prediction for a current block of a current picture. The encoder selects one of the set of candidate directions, after, for each of the set of candidate directions, performing rate-distortion analysis for encoding of the current block using that candidate direction but without rate-distortion optimization-based quantization ("RDOQ"). Then, the encoder determines how to encode a residual quadtree for the current block when encoded using the selected candidate direction. At this stage, the encoder performs rate-distortion analysis with RDOQ for different ways of encoding of the residual quadtree.

According to another aspect of the innovations described herein, during encoding of an image or video, an encoder checks whether a current block is encoded using intra BC prediction. Depending on whether the current block is encoded using intra BC prediction, the encoder enables or disables transform mode for the current block. The encoder then encodes the current block. For example, if the current block is encoded using intra BC prediction, the encoder evaluates transform skip mode but not the transform mode for the current block. Otherwise (current block is not encoded using intra BC prediction), the encoder evaluates the transform skip mode and the transform mode for the current block.

The innovations for encoder-side decisions can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 5 is a diagram illustrating motion estimation for a block of a picture.

FIGS. 6 and 7 are diagrams illustrating example approaches to determining starting points for motion estimation in different reference pictures.

FIG. 11 is a table illustrating hash values for candidate blocks in hash-based block matching.

FIGS. 12a-12c are tables illustrating example data structures that organize candidate blocks for hash-based block matching.

FIGS. 13a-13c are tables illustrating example data structures that organize candidate blocks for iterative hash-based block matching.

FIG. 18 is a diagram illustrating example directions of spatial intra-picture prediction.

FIG. 19 is a diagram illustrating example organizations for a residual quadtree.

DETAILED DESCRIPTION

Figure 1:
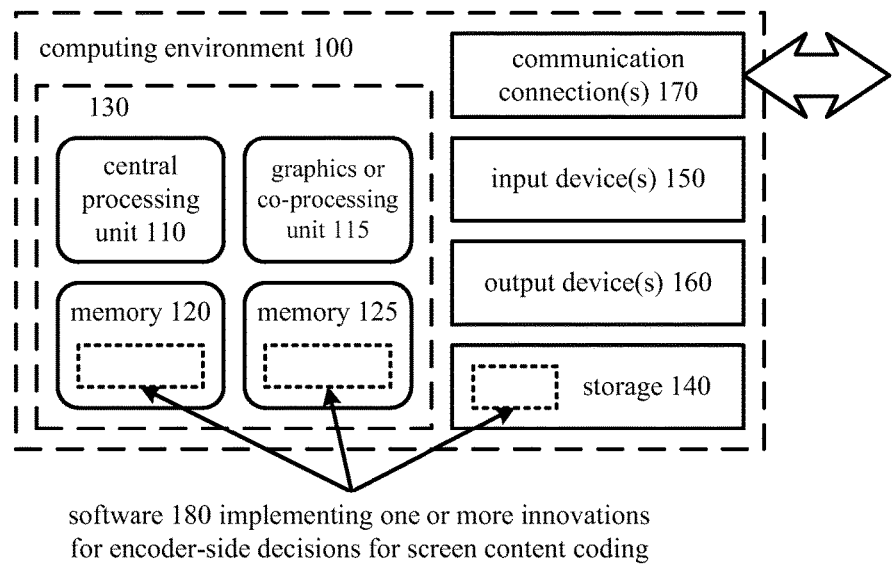
FIG. 1 is a diagram of an example computing system in which some described embodiments can be implemented.

The detailed description presents innovations in encoder-side decisions for coding of screen content video or other video. For example, some of the innovations relate to ways to speed up motion estimation by identifying appropriate starting points for the motion estimation in different reference pictures. Many of the encoder-side decisions speed up encoding by terminating encoding for a block or skipping the evaluation of certain modes or options when a condition is satisfied. For example, some of the innovations relate to ways to speed up encoding when hash-based block matching is used. Still other innovations relate to ways to identify when certain intra-picture prediction modes should or should not be evaluated during encoding. Other innovations relate to other aspects of encoding.

Although operations described herein are in places described as being performed by a video encoder, in many cases the operations can be performed by another type of media processing tool (e.g., image encoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Many of the innovations described herein can improve rate-distortion performance when encoding certain "artificially" created video content such as screen-capture content. Screen-capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video. Several of the innovations described herein (e.g., speeding up motion estimation or block vector estimation depending on results of hash-based block matching, selectively skipping certain intra-picture prediction modes) are adapted for encoding of screen content video or other artificially created video. These innovations can also be used for natural video, but may not be as effective. Other innovations described herein (e.g., calculation of starting positions for motion estimation) are effective in encoding of natural video or artificially created video.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder-side decisions for screen content coding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoder-side decisions for screen content coding.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
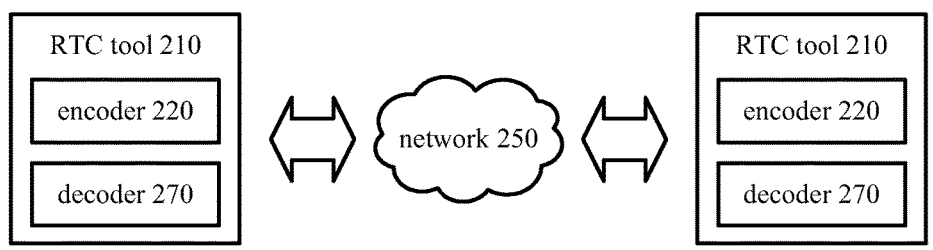
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using encoder-side decisions as described herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format, GBR 4:4:4 format or BGR 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region is a region of sample values in the frame that are used to generate BC-prediction values for the block. The intra-frame prediction region can be indicated with a block vector ("Bv") value (determined in BV estimation). For hash-based block matching during BV estimation, a hash table can be used. For intra spatial prediction for a block, the intra-picture estimator estimates extrapolation of the neighboring reconstructed sample values into the block. The intra-picture estimator can output prediction information (such as BV values for intra BC prediction, or prediction mode (direction) for intra spatial prediction), which is entropy coded. An intra-frame prediction predictor applies the prediction information to determine intra prediction values. Example approaches to making decisions during intra-picture encoding are described below.

The encoder (340) represents an inter-frame coded, predicted block of a source frame (331) in terms of prediction from reference frames. A motion estimator estimates the motion of the block with respect to one or more reference frames (369). For hash-based block matching during motion estimation, a hash table can be used. When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as motion vector ("MV") information, which is entropy coded. A motion compensator applies MVs to reference frames (369) to determine motion-compensated prediction values for inter-frame prediction. Example approaches to making decisions during inter-picture encoding are described below.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Video Encoders.

Figure 4A:
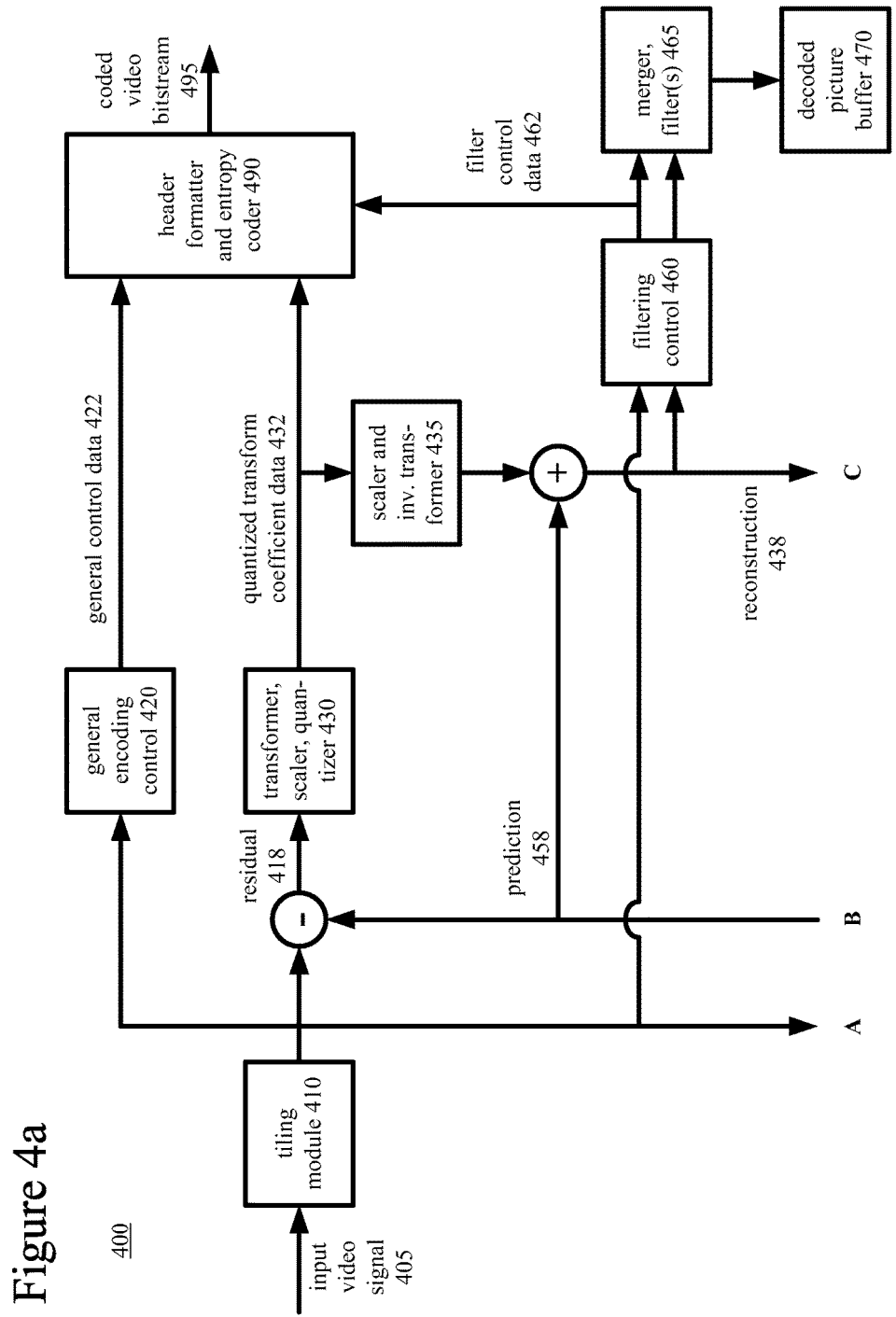
FIGS. 4a and 4b are diagrams illustrating an example video encoder in conjunction with which some described embodiments can be implemented.
Figure 4B:
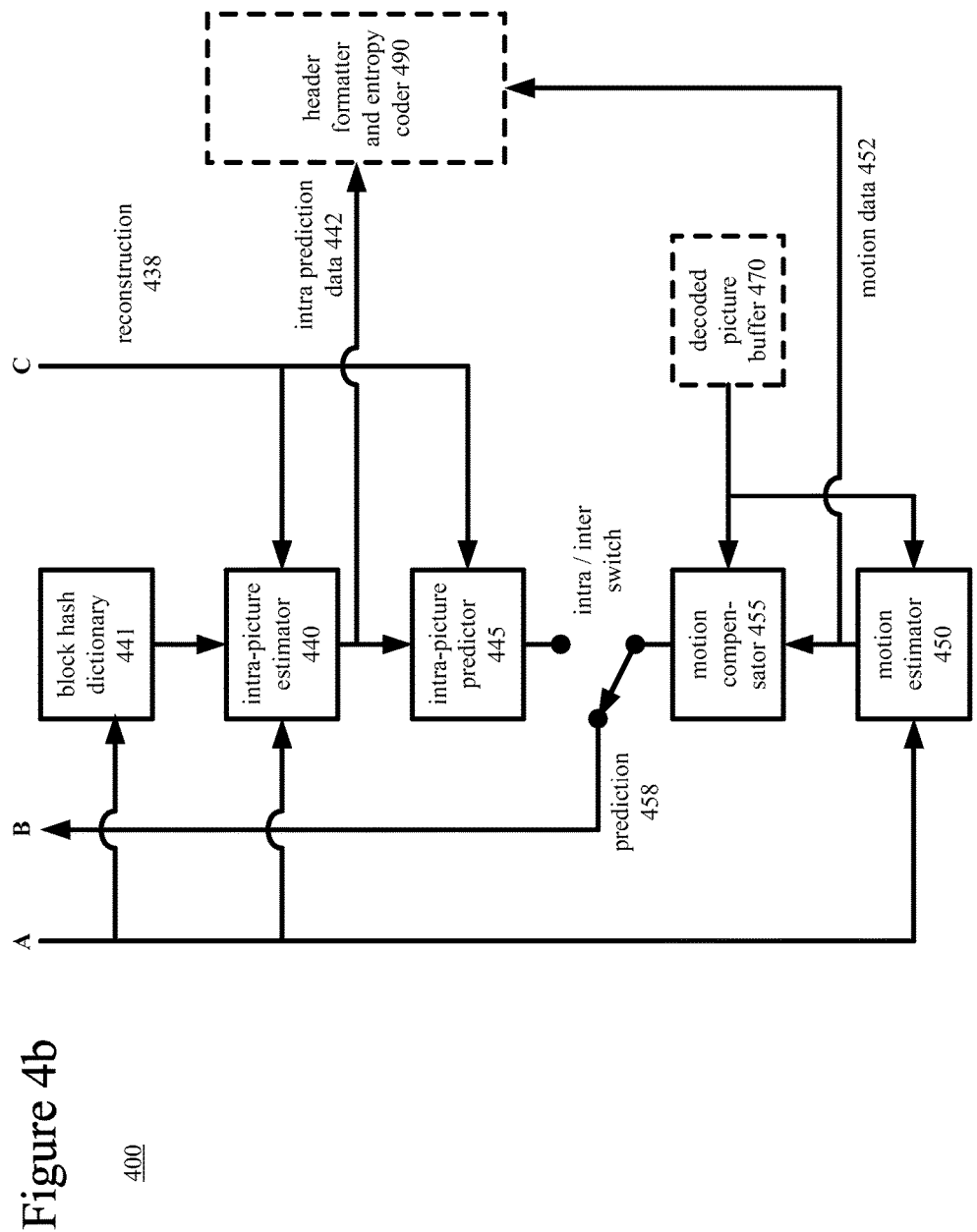

FIGS. 4a and 4b are a block diagram of a generalized video encoder (400) in conjunction with which some described embodiments may be implemented. The encoder (400) receives a sequence of video pictures including a current picture as an input video signal (405) and produces encoded data in a coded video bitstream (495) as output.

The encoder (400) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (400) compresses pictures using intra-picture coding and/or inter-picture coding. Many of the components of the encoder (400) are used for both intra-picture coding and inter-picture coding. The exact operations performed by those components can vary depending on the type of information being compressed.

A tiling module (410) optionally partitions a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. In H.265/HEVC implementations, the encoder (400) partitions a picture into one or more slices, where each slice includes one or more slice segments.

The general encoding control (420) receives pictures for the input video signal (405) as well as feedback (not shown) from various modules of the encoder (400). Overall, the general encoding control (420) provides control signals (not shown) to other modules (such as the tiling module (410), transformer/scaler/quantizer (430), scaler/inverse transformer (435), intra-picture estimator (440), motion estimator (450) and intra/inter switch) to set and change coding parameters during encoding. In particular, the general encoding control (420) can manage decisions about encoding modes during encoding. The general encoding control (420) can also evaluate intermediate results during encoding, for example, performing rate-distortion analysis. The general encoding control (420) produces general control data (422) that indicates decisions made during encoding, so that a corresponding decoder can make consistent decisions. The general control data (422) is provided to the header formatter/entropy coder (490).

If the current picture is predicted using inter-picture prediction, a motion estimator (450) estimates the motion of blocks of sample values of a current picture of the input video signal (405) with respect to one or more reference pictures. The decoded picture buffer (470) buffers one or more reconstructed previously coded pictures for use as reference pictures. For hash-based block matching during the motion estimation, the motion estimator (450) can use a block hash dictionary (not shown) to find an MV value for a current block. The block hash dictionary is a data structure that organizes candidate blocks for hash-based block matching, as described below. The block hash dictionary is an example of a hash table. The motion estimator (450) can use results from hash-based block matching to make decisions about whether to perform certain stages of encoding (e.g., fractional-precision motion estimation, evaluation of coding modes and options for a motion-compensated block), as explained below.

When multiple reference pictures are used, the multiple reference pictures can be from different temporal directions or the same temporal direction. The motion estimator (450) can determine starting points for motion estimation in the different reference pictures using an approach explained below.

The motion estimator (450) produces as side information motion data (452) such as MV data, merge mode index values, and reference picture selection data. The motion data (452) is provided to the header formatter/entropy coder (490) as well as the motion compensator (455).

The motion compensator (455) applies MVs to the reconstructed reference picture(s) from the decoded picture buffer (470). The motion compensator (455) produces motion-compensated predictions for the current picture.

In a separate path within the encoder (400), an intra-picture estimator (440) determines how to perform intra-picture prediction for blocks of sample values of a current picture of the input video signal (405). The current picture can be entirely or partially coded using intra-picture coding. Using values of a reconstruction (438) of the current picture, for intra spatial prediction, the intra-picture estimator (440) determines how to spatially predict sample values of a current block of the current picture from neighboring, previously reconstructed sample values of the current picture. The intra-picture estimator (440) can determine the direction of spatial prediction to use for a current block (and making other encoding decisions for the current block) using an approach explained below.

Or, for intra BC prediction using BV values, the intra-picture estimator (440) estimates displacement of the sample values of the current block to different candidate reference regions within the current picture. For hash-based block matching during the BV estimation, the intra-picture estimator (440) can use a block hash dictionary (441) to find a BV value for a current block. The block hash dictionary (441) is a data structure that organizes candidate blocks for hash-based block matching, as described below. The block hash dictionary (441) is an example of a hash table. The intra-picture estimator (440) can use results from hash-based block matching to make decisions about whether to perform certain stages of encoding (e.g., evaluation of coding modes and options for an intra-BC-predicted block), as explained below. In FIG. 4b, the block hash dictionary (441) is constructed based upon original sample values. Alternatively, a block hash dictionary can be constructed based upon reconstructed sample values and updated during encoding to store information about new candidate blocks, as those candidate blocks become available for use in hash-based block matching.

Or, for an intra-picture dictionary coding mode, pixels of a block are encoded using previous sample values stored in a dictionary or other location, where a pixel is a set of co-located sample values (e.g., an RGB triplet or YUV triplet). For example, the encoder (400) can calculate hash values of previously reconstructed sample values (e.g., groupings of 1 pixel, 2 pixels, 4 pixels, 8 pixels, and so on) and compare those hash values to a hash value of a set of current pixels being encoded. Matches of length one or more can be identified in the previously reconstructed sample values based on the hash comparison. The current pixel(s) (or sample values) can be encoded in various 1-D and pseudo 2-D dictionary modes, using an offset that identifies a location within previous pixels (e.g., in a dictionary) and a length indicating a number of pixels being predicted from that offset. Typically, no residual is calculated for a block encoded in intra-picture dictionary coding mode.

The intra-picture estimator (440) produces as side information intra prediction data (442), such as information indicating whether intra prediction uses spatial prediction, intra BC prediction or a dictionary mode, prediction mode direction (for intra spatial prediction), BV values (for intra BC prediction) and offsets and lengths (for dictionary mode). The intra prediction data (442) is provided to the header formatter/entropy coder (490) as well as the intra-picture predictor (445).

According to the intra prediction data (442), the intra-picture predictor (445) spatially predicts sample values of a current block of the current picture from neighboring, previously reconstructed sample values of the current picture. Or, for intra BC prediction, the intra-picture predictor (445) predicts the sample values of the current block using previously reconstructed sample values of an intra-picture prediction reference region, which is indicated by a BV value for the current block. In some cases, the BV value can be a BV predictor (predicted BV value). In other cases, the BV value can be different than its predicted BV value, in which case a BV differential indicates the difference between the predicted BV value and BV value. Or, for intra-picture dictionary mode, the intra-picture predictor (445) reconstructs pixels using offsets and lengths.

The intra/inter switch selects whether the prediction (458) for a given block will be a motion-compensated prediction or intra-picture prediction. The encoder (400) can skip evaluation of certain coding modes (such as intra BC prediction and/or dictionary coding) for a block depending on the number of colors in the block, as explained below.

For a non-dictionary mode, the difference (if any) between a block of the prediction (458) and a corresponding part of the original current picture of the input video signal (405) provides values of the residual (418), for a non-skip-mode block. During reconstruction of the current picture, for a non-skip-mode block (that is not coded in dictionary mode), reconstructed residual values are combined with the prediction (458) to produce an approximate or exact reconstruction (438) of the original content from the video signal (405). (In lossy compression, some information is lost from the video signal (405).)

In the transformer/scaler/quantizer (430), for non-dictionary modes, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block using an approach explained below. The encoder (400) can also skip the transform step in some cases. For example, for an intra-BC-predicted block, the encoder (400) can skip the transform step, as explained below.

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (432) is provided to the header formatter/entropy coder (490).

In the scaler/inverse transformer (435), for non-dictionary modes, a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. For a non-skip-mode block (that is not coded in dictionary mode), the encoder (400) combines reconstructed residual values with values of the prediction (458) (e.g., motion-compensated prediction values, intra-picture prediction values) to form the reconstruction (438). For a skip-mode block or dictionary-mode block, the encoder (400) uses the values of the prediction (458) as the reconstruction (438).

For intra-picture prediction, the values of the reconstruction (438) can be fed back to the intra-picture estimator (440) and intra-picture predictor (445). Values of the reconstruction (438) can also be used to update the block hash dictionary, in some implementations. Also, the values of the reconstruction (438) can be used for motion-compensated prediction of subsequent pictures. The values of the reconstruction (438) can be further filtered. A filtering control (460) determines how to perform deblock filtering and SAO filtering on values of the reconstruction (438), for a given picture of the video signal (405). The filtering control (460) produces filter control data (462), which is provided to the header formatter/entropy coder (490) and merger/filter(s) (465).

In the merger/filter(s) (465), the encoder (400) merges content from different tiles into a reconstructed version of the picture. The encoder (400) selectively performs deblock filtering and SAO filtering according to the filter control data (462), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (400), and the encoder (400) may provide syntax within the coded bitstream to indicate whether or not such filtering was applied. The decoded picture buffer (470) buffers the reconstructed current picture for use in subsequent motion-compensated prediction.

The header formatter/entropy coder (490) formats and/or entropy codes the general control data (422), quantized transform coefficient data (432), intra prediction data (442), motion data (452) and filter control data (462). For the motion data (452), the header formatter/entropy coder (490) can select and entropy code merge mode index values, or a default MV predictor can be used. In some cases, the header formatter/entropy coder (490) also determines MV differentials for MV values (relative to MV predictors for the BV values), then entropy codes the MV differentials, e.g., using context-adaptive binary arithmetic coding. For the intra prediction data (442), the header formatter/entropy coder (490) can select and entropy code BV predictor index values (for intra BC prediction), or a default BV predictor can be used. In some cases, the header formatter/entropy coder (490) also determines BV differentials for BV values (relative to BV predictors for the BV values), then entropy codes the BV differentials, e.g., using context-adaptive binary arithmetic coding.

The header formatter/entropy coder (490) provides the encoded data in the coded video bitstream (495). The format of the coded video bitstream (495) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (400) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (400). The relationships shown between modules within the encoder (400) indicate general flows of information in the encoder; other relationships are not shown for the sake of simplicity.

V. Determining Starting Points for Motion Estimation in Different Reference Pictures.

This section presents various ways to speed up motion estimation by identifying appropriate starting points for the motion estimation in different reference pictures.

A. Motion Estimation and MV Values—Introduction.

For motion estimation, the sample values of a current block of a current picture are predicted using sample values in another picture, which is called the reference picture. A motion vector ("MV") value indicates a displacement from the position of the current block in the reference picture to a region of the reference picture (the "reference region") that includes the sample values used for prediction. The reference region provides predicted values for the current block. The sample values used for prediction are previously reconstructed sample values, which are thus available at the encoder during encoding and at the decoder during decoding. The MV value is signaled in the bitstream, and a decoder can use the MV value to determine the reference region of the reference picture to use for prediction, which is also reconstructed at the decoder. When multiple reference pictures are available, the bitstream can also include an indication of which of the reference picture to use to find the reference region.

FIG. 5 illustrates motion estimation for a current block (530) of a current picture (510). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Thus, the current block can be square or rectangular. Alternatively, the current block can have some other shape.

The MV value (540) indicates a displacement (or offset) from the position of the current block (530) to a reference region (sometimes called a reference block) in a reference picture (550), which includes the sample values used for prediction. The reference region indicated by the MV value (540) is sometimes called the "matching block" for the current block (530). The matching block can be identical to the current block (530), or it can be an approximation of the current block (530). Suppose the top-left position of the current (530) block is at position ($x_0$, $y_0$) in the current picture (510), and suppose the top-left position of the reference region is at position ($x_1$, $y_1$) in the reference picture (550). The MV value (540) indicates the displacement ($x_1-x_0$, $y_1-y_0$). For example, if the top-left position of the current block is at position (256, 128), and the top-left position of the reference region is at position (126, 104), the MV value is (−130, −24). In this example, a negative horizontal displacement indicates a position to the left of the current block, and a negative vertical displacement indicates a position above the current block.

The reference region for the current block (530) is selected from among multiple candidate blocks during motion estimation. FIG. 5 also shows some of the candidate blocks for the current block (530) of the current picture (510) in motion estimation. Four MV values (541, 542, 543, 544) indicate displacements for four candidate blocks. In general, the candidate blocks can be anywhere within the reference picture (550). A candidate block can overlap with other candidate blocks, as shown for the candidate blocks indicated by the MV values (543, 544). The computational complexity of motion estimation is especially problematic when the search range for MV values encompasses all of a reference picture, due to the large number of candidate blocks against which a current block is compared. This computational complexity is compounded when motion estimation is performed for multiple reference pictures. An encoder can limit the computational complexity of motion estimation, in many cases, by starting motion estimation at a point likely to yield an MV value with good prediction, then expanding outward from that starting point as needed to evaluate other candidate blocks, and terminating the search process as soon as the encoder finds an MV value that is good enough.

In some previous implementations of motion estimation for multiple reference pictures, an encoder determines the starting point for motion estimation in a reference picture as follows. The encoder identifies the position of an MV predictor as the starting point of motion estimation. For example, for a current block, the encoder obtains two MV predictors (using an MV value that was used to encode a spatially neighboring block or a temporally neighboring block) and selects the MV predictor with the smaller prediction error (or prediction cost) as the starting point of motion estimation in a reference picture. If the reference picture used by the neighboring block is different than the reference picture being evaluated for motion estimation for the current block, the encoder scales the MV predictor according to differences in picture order count ("POC") values.

For example, suppose the POC value of the current picture is 10, and the left neighbor block uses a reference picture having a POC value of 9. The MV value of the left neighbor block is (1, 2), and it is used as an MV predictor for the current block. For motion estimation in the reference picture with the POC value of 9, the starting point of the motion estimation is the location that is (1, 2) away from the coordinates of the top-left position of the current block. For another reference picture, however, the MV predictor is scaled. For example, suppose the encoder performs motion estimation in a reference picture with the POC value of 0. The MV predictor from the left neighbor block is scaled by a factor of (10−9)/(10−0)=10. So, the MV predictor becomes (10, 20), and the starting point of the motion estimation in the reference picture (with POC value of 0) is the location that is (10, 20) away from the coordinates of the top-left position of the current block.

Scaling of MV predictor values to determine starting points for motion estimation is unreliable in many scenarios. In particular, such starting points can lead to inefficient motion estimation for video with large magnitude of motion, which is common for screen capture video and other artificially created video.

B. Selecting Appropriate Starting Points for Motion Estimation in Different Reference Pictures.

This section presents various ways to speed up motion estimation by identifying appropriate starting points for the motion estimation in different reference pictures. By selecting starting points that are more likely to yield appropriate MV values quickly, the computational complexity of motion estimation can be reduced by early termination of the search process.

FIG. 6 shows an example approach to determining starting points for motion estimation in different reference pictures. In this approach, the encoder uses an MV value of a neighboring block, which references a location in a reference picture, to determine the starting point of motion estimation only in the same reference picture, without scaling. For a different reference picture, the encoder uses a different MV value, which references a location in that different reference picture, to determine the starting point of motion estimation, without scaling. The encoder can buffer the MV values (and indicators of reference pictures) used to encode the blocks in the current picture, as well as the best MV values evaluated during motion estimation for other reference pictures for the respective blocks in the current picture, and use such buffered MV values when selecting starting points for motion estimation.

In FIG. 6, the current block (630) of a current picture (610) includes three spatially neighboring blocks (631, 632, 633) to the left, above and above-right the current block (630), respectively. For each of the spatially neighboring blocks (631, 632, 633), the encoder buffers two MV values. One of the MV values (641, 642 or 643) indicates a location in a first reference picture (660). The other MV value (651, 652 or 653) indicates a location in a second reference picture (670). For the first reference picture (660), the encoder determines a starting point (664) for motion estimation at a location indicated by an MV predictor (662) based on the neighbor MV values (641, 642, 643) associated with the first reference picture (660). For example, the encoder selects the MV predictor (662) to be the neighbor MV value (641, 642 or 643) with the best prediction cost or lowest prediction error, or determines the MV predictor (662) as the component-wise median of the neighbor MV values (641, 642, 643), or otherwise derives the MV predictor (662) based on the neighbor MV values (641, 642, 643). Similarly, for the second reference picture (670), the encoder determines a starting point (674) for motion estimation at a location indicated by an MV predictor (672) based on the neighbor MV values (651, 652, 653) associated with the second reference picture (670). For example, the encoder selects the MV predictor (672) to be the neighbor MV value (651, 652 or 653) with the best prediction cost or lowest prediction error, or determines the MV predictor (672) as the component-wise median of the neighbor MV values (651, 652, 653), or otherwise derives the MV predictor (672) based on the neighbor MV values (651, 652, 653).

Figure 7:
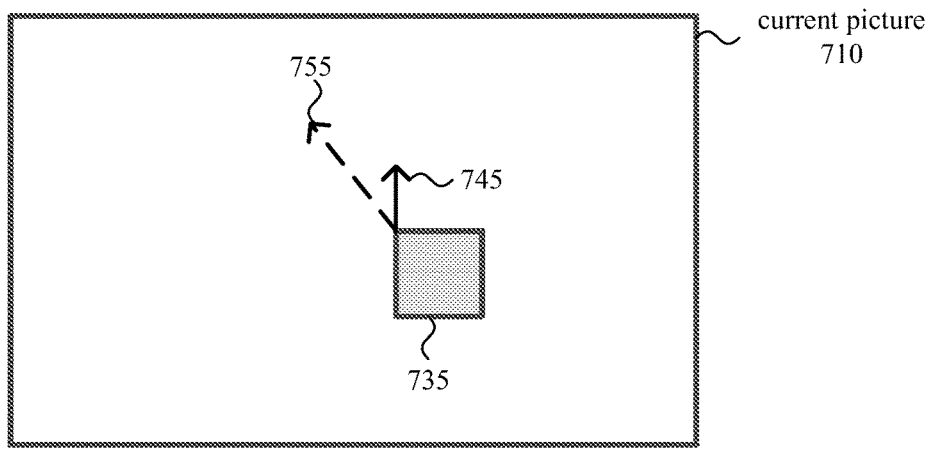

FIG. 7 shows another example approach to determining starting points for motion estimation in different reference pictures. In this approach, the encoder uses an MV value of a larger block that includes the current block, which references a location in a reference picture, as the starting point of motion estimation only in the same reference picture, without scaling. For a different reference picture, the encoder uses a different MV value for the larger block, which references a location in that different reference picture, as the starting point of motion estimation, without scaling. The encoder can buffer the MV values (and indicators of reference pictures) used to encode blocks of a given size (e.g., 64×64) in the current picture, as well as the best MV values evaluated during motion estimation for other reference pictures for the respective blocks of the given size, and use such buffered MV values when selecting starting points for motion estimation for smaller blocks (e.g., 32×32 blocks, 32×64 blocks or 64×32 blocks). This can be helpful, for example, when the encoder evaluates MV values for different sizes of blocks (such as variable-size PUs).

In FIG. 7, a larger block (735) of a current picture (710) includes a current block. For the larger block (735), the encoder buffers two MV values. One of the MV values (745) indicates a location in a first reference picture. The other MV value (755) indicates a location in a second reference picture. For the first reference picture, the encoder determines a starting point for motion estimation at a location indicated by an MV predictor based on the first buffered MV value (745), which is associated with the first reference picture. Similarly, for the second reference picture, the encoder determines a starting point for motion estimation at a location indicated by an MV predictor based on the second buffered MV value (755), which is associated with the second reference picture.

When multiple larger blocks of different sizes have buffered MV values (e.g., a 64×64 block, a 32×32 block and a 64×32 block, for motion estimation for a 16×16 block within the respective larger blocks), the encoder can select one of the buffered MV values by rule (e.g., the MV value of the appropriate reference picture for the next larger block, or the MV value that is used by a majority of the larger blocks for the appropriate reference picture) or by identifying which provides the best prediction performance or lowest prediction cost.

Alternatively, the encoder can first determine MV values for smaller blocks in a current picture, buffering the MV values associated with different reference pictures for the smaller blocks, and then use the buffered MV values to select starting points for motion estimation of larger blocks that overlap the smaller blocks. In this case, when determining the starting point for motion estimation for a larger block, the encoder can select among the buffered MV values of smaller blocks within the larger block by rule (e.g., the MV value of the appropriate reference picture for the first smaller block, or the MV value that is used by a majority of the smaller blocks for the appropriate reference picture) or by identifying which provides the best prediction performance or lowest prediction cost.

Also, the encoder can select between the MV value of a larger block that includes the current block (or multiple larger blocks that include the current block, or one or more smaller blocks within the current block) and the MV values of spatially neighboring blocks. For example, for a current 32×32 block, the encoder can compare the prediction error from using the MV value of a larger 64×64 block to the prediction errors from using the MV values from spatially neighboring 32×32 blocks, and select the one with smaller prediction error (or prediction cost) to indicate the starting point for motion estimation. For the largest size blocks (e.g., 64×64), the encoder can use an MV value of a neighboring 64×64 block with the same reference picture as the starting point of motion estimation.

Figure 8:
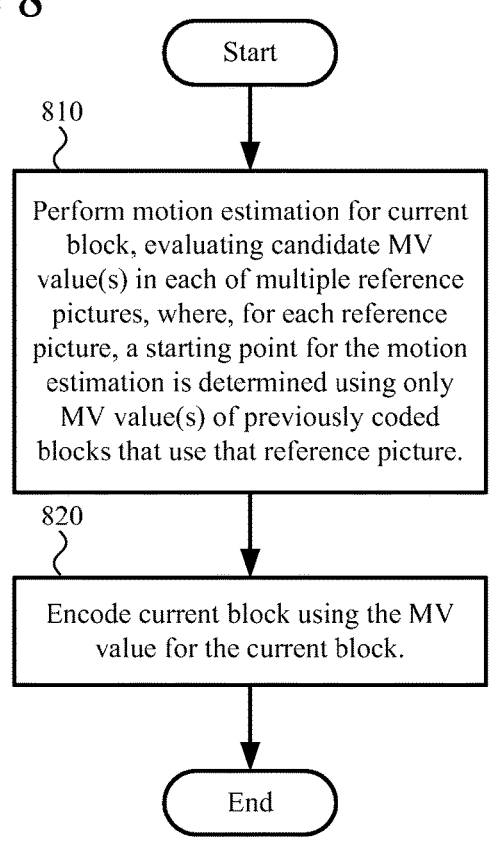
FIG. 8 is a flowchart illustrating a generalized technique for performing motion estimation in which a starting point in a reference picture is determined using only MV values that use that reference picture.

FIG. 8 is a flowchart illustrating a generalized technique (800) for performing motion estimation in which a starting point in a reference picture is determined using only MV values that use that reference picture (that is, not using any MV values that use any other reference picture). A video encoder such as one described with reference to FIG. 3 or FIGS. 4a-4b can perform the technique (800).

The encoder encodes video to produce encoded data, which the encoder outputs in a bitstream. As part of the encoding, the encoder performs (810) motion estimation for a current block of a current picture in order to select an MV value for the current block. As part of the motion estimation, the encoder evaluates one or more candidate MV values in each of multiple reference pictures. For each of the multiple reference pictures, the encoder determines a starting point for the motion estimation using only one or more MV values of previously coded blocks that use that reference picture (that is, not using any MV values of previously coded blocks that use any other reference picture). The previously coded blocks can include one or more larger blocks (that include the current block) in the current picture, one or more smaller blocks (that overlap the current block) in the current picture, one or more spatially neighboring blocks in the current picture, or a temporally adjacent block in another picture. The encoder then encodes (820) the current block using the MV value for the current block.

For example, when performing the motion estimation for the current block, for each of the multiple reference pictures, the encoder determines an MV predictor from the one or more MV values of previously coded blocks that use that reference picture. The encoder then uses a location indicated by the MV predictor as the starting point for the motion estimation in that reference picture. Alternatively, the starting point can be some other location around the location indicated by the MV predictor.

The encoder buffers the MV values of previously coded blocks for use in determining starting points for motion estimation. The MV values of the previously coded blocks can include actual MV values used during encoding of the previously coded blocks. The MV values of the previously coded blocks can also include candidate MV values evaluated during motion estimation for the previously coded blocks, but not used during encoding of the previously coded blocks.

For the current picture, the encoder can perform motion estimation in a top-down manner, starting with blocks of the largest size and finishing with blocks of the smallest size. For example, the encoder performs motion estimation for blocks of the current picture having a first size. The encoder buffers MV values for the blocks having the first size (e.g., actual MV values used during encoding of the blocks having the first size, and candidate MV values evaluated during the motion estimation for blocks having the first size but not used during encoding of the blocks having the first size). The encoder performs motion estimation for blocks of the current picture having a second size, using at least some of the buffered MV values to select starting points for the motion estimation for the blocks of the second size. Alternatively, for the current picture, the encoder can perform motion estimation in a bottom-up manner, starting with blocks of the smallest size and finishing with blocks of the largest size.

VI. Skipping Encoding Stages Based on Results of Hash-Based Block Matching.

This section presents various ways to speed up encoding when hash-based block matching is used. The hash-based block matching can be used for motion estimation (as described in the previous section) or for block vector estimation.

A. Intra BC Prediction Mode and BV Values—Introduction.

For intra BC prediction, the sample values of a current block of a picture are predicted using sample values in the same picture. A BV value indicates a displacement from the current block to a region of the picture (the "reference region") that includes the sample values used for prediction. The reference region provides predicted values for the current block. The sample values used for prediction are previously reconstructed sample values, which are thus available at the encoder during encoding and at the decoder during decoding. The BV value is signaled in the bitstream, and a decoder can use the BV value to determine the reference region of the picture to use for prediction, which is also reconstructed at the decoder. Intra BC prediction is a form of intra-picture prediction—intra BC prediction for a block of a picture does not use any sample values other than sample values in the same picture.

Figure 9:
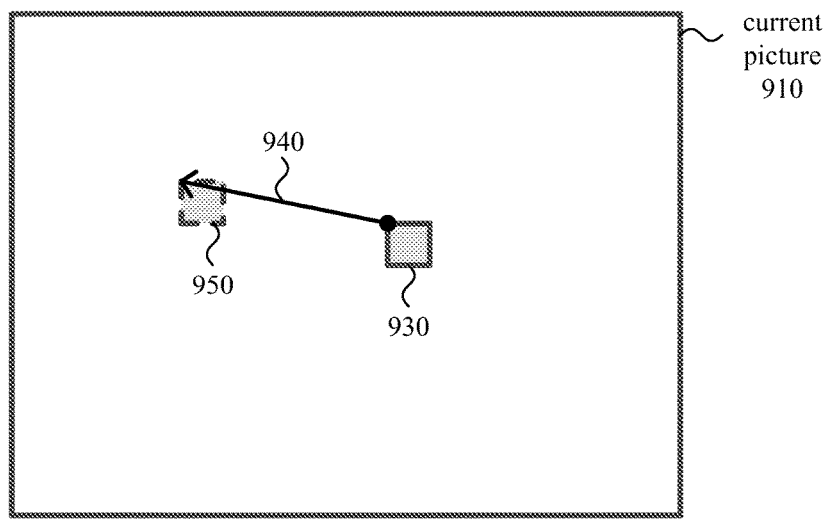
FIGS. 9 and 10 are diagrams illustrating intra BC prediction for a block of a picture and candidate blocks for the block in block matching.

FIG. 9 illustrates intra BC prediction for a current block (930) of a current picture (910). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Thus, the current block can be square or rectangular. Alternatively, the current block can have some other shape.

The BV (940) indicates a displacement (or offset) from the current block (930) to a reference region (950) of the picture that includes the sample values used for prediction. The reference region (950) indicated by the BV (940) is sometimes termed the "matching block" for the current block (930). The matching block can be identical to the current block (930), or it can be an approximation of the current block (930). Suppose the top-left position of a current block is at position $(x_0, y_0)$ in the current picture, and suppose the top-left position of the reference region is at position $(x_1, y_1)$ in the current picture. The BV indicates the displacement $(x_1-x_0, y_1-y_0)$. For example, if the top-left position of the current block is at position (256, 128), and the top-left position of the reference region is at position (126, 104), the BV value is (−130, −24). In this example, a negative horizontal displacement indicates a position to the left of the current block, and a negative vertical displacement indicates a position above the current block.

Figure 10:
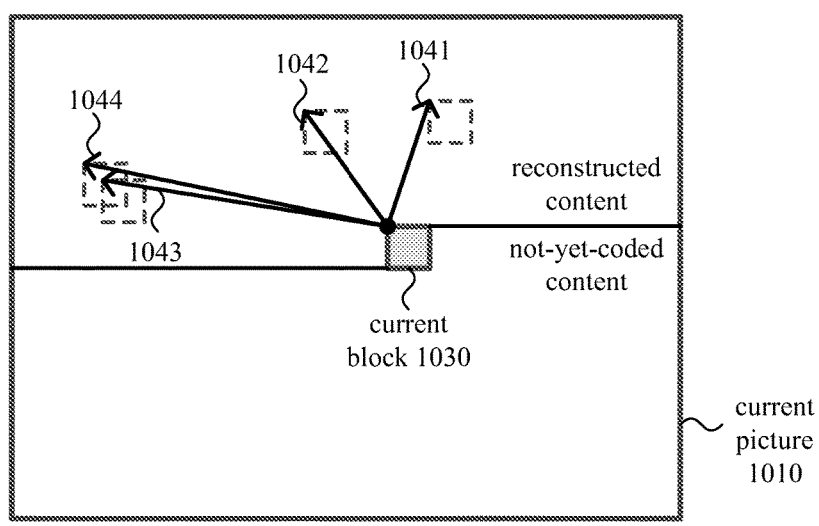

Intra BC prediction can improve coding efficiency by exploiting redundancy (such as repeated patterns inside a picture) using BC operations. Finding a matching block for a current block can be computationally complex and time consuming, however, considering the number of candidate blocks that the encoder may evaluate. FIG. 10 shows some of the candidate blocks for a current block (1030) of a current picture (1010) in block matching operations. Four BVs (1041, 1042, 1043, 1044) indicate displacements for four candidate blocks. The candidate blocks can be anywhere within the reconstructed content of the current picture (1010). (Blocks are generally coded from left-to-right, then from top-to-bottom.) A candidate block can overlap with other candidate blocks, as shown for the candidate blocks indicated by the BVs (1043, 1044). The computational complexity of BV estimation is especially problematic when the search range for BV values encompasses all of the previously reconstructed areas of a picture, due to the large number of candidate blocks against which a current block is compared. For candidate blocks of an entire frame, the number of operations is even higher. Similarly, if the search range includes another previously reconstructed frame (for motion estimation), the number of operations is potentially very high. For example, for motion estimation that involves a single reference frame (or multiple reference frames), sample-wise block matching can consume a very large number of operations, due to the large number of candidate blocks against which a current block is compared.

B. Hash-Based Block Matching.

When an encoder uses hash-based block matching, the encoder determines a hash value for each of multiple candidate blocks. A hash table stores the hash values for the candidate blocks. The encoder also determines a hash value for a current block by the same hashing approach, and then searches the hash table for a matching hash value. If two blocks are identical, their hash values are the same. Using hash values, an encoder can quickly and efficiently identify candidate blocks that have the same hash value as the current block, and filter out candidate blocks that have different hash values. The encoder can then further evaluate those candidate blocks having the same hash value as the current block. (Different blocks can have the same hash value. So, among the candidate blocks with the same hash value, the encoder can identify a candidate block that matches the current block.) Hash-based block matching typically speeds up the block matching process for a current block.

In some example implementations, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, reconstructed sample values from the matching block are used to represent the current block. Thus, BC prediction operations (and motion compensation operations) still use reconstructed sample values. Alternatively, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks.

FIG. 11 illustrates hash values (1100) for candidate blocks B(x, y) in hash-based block matching, where x and y indicate horizontal and vertical coordinates, respectively, for the top-left position of a given candidate block. The candidate blocks have hash values determined using a hash function h( ). For a candidate block B(x, y) in a search range, the encoder determines a hash value h(B) for the candidate block. The encoder can determine hash values for all candidate blocks in the search range. Or, the encoder can screen out candidate blocks having certain patterns of sample values (e.g., patterns that are easily predicted with another prediction mode such as spatial intra-picture prediction).

In general, the hash function h( ) yields n possible hash values, designated $h_0$ to $h_{n-1}$. For a given hash value, the candidate blocks with that hash value are grouped. For example, in FIG. 11, the candidate blocks B(1266, 263), B(1357, 365), B(1429, 401), B(502, 464), ... have the hash value $h_0$. Groups can include different numbers of candidate blocks. For example, in FIG. 11, the group for hash value $h_4$ includes a single candidate block, while the group for hash value $h_0$ includes more than four candidate blocks.

In this way, the possible candidate blocks are distributed into n categories. For example, if the hash function h( ) produces 12-bit hash values, the candidate blocks are split into $2^{12}=4,096$ categories. In some implementations, the number of candidate blocks per hash value can be further reduced by eliminating redundant, identical blocks with that hash value, or by screening out candidate blocks having certain patterns of sample values. Also, in some implementations, the encoder can iteratively winnow down the number of candidate blocks using different hash functions.

The hash function used for hash-based block matching depends on implementation. A hash function can produce hash values with 8 bits, 12 bits, 16 bits, 24 bits, 32 bits, or some other number of bits. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks. The hash function h( ) can be a cryptographic hash function, part of a cryptographic hash function, cyclic redundancy check ("CRC") function, part of a CRC, or another hash function (e.g., using averaging and XOR operations to determine the signature of a candidate block or current block). Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value, which may be suitable when a matching block can approximate the current block.

During hash-based block matching, with the hash function h( ) the encoder determines the hash value for the current block $B_{current}$. In FIG. 11, the hash value $h(B_{current})$ is $h_3$. Using the hash value of the current block, the encoder can identify candidate blocks that have the same hash value (shown in outlined box in FIG. 11), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can identify a matching block for the current block (e.g., using sample-wise block matching operations).

Overall, since hash value comparisons are much simpler than sample-wise block matching, hash-based block matching can make the process of evaluating the candidate blocks in a large search range much more efficient. Also, hash values for candidate blocks can be reused in hash-based block matching for different blocks within a picture during encoding. In this case, the cost of computing the hash values for the candidate blocks can be amortized across hash-based block matching operations for the entire picture.

C. Data Structures for Hash-Based Block Matching.

In some example implementations, the encoder uses a data structure that organizes candidate blocks according to their hash values. The data structure can help make hash-based block matching more computationally efficient. The data structure implements, for example, a block hash dictionary or hash table as described herein.

FIG. 12a illustrates an example data structure (1200) that organizes candidate blocks for hash-based block matching. For the hash function h( ), the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$, k) includes information for the $k^{th}$ candidate block with the hash value $h_i$. As shown in FIG. 12b, an entry in a candidate block list can include the address of a block B(x, y) (e.g., horizontal and vertical coordinates for the top-left position of the block). Or, as shown in FIG. 12c, an entry in a candidate block list can include the address of a block B(x, y) and a hash value from a second hash function, which can be used for iterative hash-based block matching.

During hash-based block matching for a current block (for BV estimation or motion estimation), the encoder determines the hash value of the current block $h(B_{current})$. The encoder retains the candidate block list with the same hash value and rules out the other n−1 lists. To select the matching block, the encoder can compare the current block with the candidate block(s), if any, in the retained candidate block list. Thus, by a simple lookup operation using the hash value $h(B_{current})$, the encoder can eliminate (n−1)/n of the candidate blocks (on average), and focus on the remaining 1/n candidate blocks (on average) in the retained list, significantly reducing the number of sample-wise block matching operations.

The data structure can be considered a dynamic dictionary in which each entry represents a candidate block. When hash values for candidate blocks are determined from input sample values, the data structure grows as block hash values are computed for more blocks. The number of blocks represented with block hash values can vary, depending on how many blocks the encoder screens out. Also, the number of blocks that have a given block hash value will change from picture-to-picture. During encoding, the encoder checks that a candidate block with a matching block hash value is actually available for use as a reference region (e.g., is part of a previously encoded and reconstructed content). When hash values for candidate blocks are determined from reconstructed sample values, the data structure grows during encoding, as more candidate blocks are added to the reconstructed content of a picture and hence made available for use in hash-based block matching for later blocks of the picture. In particular, after a current block is encoded, new candidate blocks that overlap the just-encoded current block are available for use as reference regions.

Different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. Alternatively, a single, unified data structure can be used for different sizes of blocks. A hash function can produce an n-bit hash value, where m bits of the n-bit hash value indicate a hash value among the possible blocks of a given block size according to an m-bit hash function, and the remaining n-m bits of the n-bit hash value indicate the given block size. For example, the first two bits of a 14-bit hash function can indicate a block size, while the remaining 12 bits indicate a hash value according to a 12-bit hash function. Or, a hash function can produce an m-bit hash value regardless of the size of the block, and an entry for a candidate block in the data structure stores information indicating the block size for the candidate block, which can be used in hash-based block matching.

For a high-resolution picture, the data structure can store information representing a very large number of candidate blocks. To reduce the amount of memory used for the data structure, the encoder can eliminate redundant values. For example, the encoder can skip adding identical blocks to the data structure. In general, reducing the size of the data structure by eliminating identical blocks can hurt coding efficiency. Thus, by deciding whether to eliminate identical blocks, the encoder can trade off memory size for the data structure and coding efficiency. The encoder can also screen out candidate blocks, depending on the content of the blocks, which are unlikely to benefit from intra BC prediction.

D. Iterative Hash-Based Block Matching.

When the encoder uses a single hash function with n possible hash values, the encoder can rule out n−1 lists of candidate blocks based on the hash value of a current block, but the encoder may still need to perform sample-wise block matching operations for the remaining candidate block(s), if any, for the list with the matching hash value. Also, when updating a data structure that organizes candidate blocks, the encoder may need to perform sample-wise block matching operations to identify identical blocks. Collectively, these sample-wise block matching operations can be computationally intensive.

Therefore, in some example implementations, the encoder uses iterative hash-based block matching. Iterative hash-based block matching can speed up the block matching process and also speed up the process of updating a data structure that organizes candidate blocks.

Iterative hash-based block matching uses multiple hash values determined with different hash functions. For a block B (current block or candidate block), in addition to the hash value h(B), the encoder determines another hash value h'(B) using a different hash function h'( ). With the first hash value h($B_{current}$) for a current block, the encoder identifies candidate blocks that have the same hash value for the first hash function h( ). To further rule out some of these identified candidate blocks, the encoder uses a second hash value h'($B_{current}$) for the current block, which is determined using a different hash function. The encoder compares the second hash value h'($B_{current}$) with the second hash values for the previously identified candidate blocks (which have same first hash value), in order to filter out more of the candidate blocks. A hash table tracks hash values for the candidate blocks according to the different hash functions.

In the example of FIG. 12a, if h($B_{current}$)=$h_3$, the encoder selects the candidate blocks with entry(3, 0), entry (3, 1), entry(3, 2), entry(3, 3), . . . for further refinement. As shown in FIG. 12c, for a candidate block B, an entry includes a block address and a second hash value h'(B) from the hash function h'( ). The encoder compares the second hash value h'($B_{current}$) for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks, if any, that have first and second hash values matching h($B_{current}$) and h'($B_{current}$), respectively. The encoder can perform sample-wise block matching on any remaining candidate blocks to select a matching block.

FIGS. 13a-13c show another example of iterative hash-based block matching that uses a different data structure. The data structure (1300) in FIG. 13a organizes candidate blocks by first hash value from a first hash function h( ) which has n1 possible hash values. The data structure (1300) includes lists for hash values from $h_0$ . . . $h_{n1-1}$. In the example, the encoder determines a first hash value h($B_{current}$)=$h_2$ for the current block, and selects the list for $h_2$ from the structure (1300).

As shown in FIG. 13b, the list (1310) for $h_2$ includes multiple lists that further organize the remaining candidate blocks by second hash value from a second hash function h'( ) which has n2 possible hash values. The list (1310) includes lists for hash values from $h'_0$ . . . $h'_{n2-1}$, each including entries with block addresses (e.g., horizontal and vertical coordinates for top-left positions of respective candidate blocks), as shown for the entry (1320) in FIG. 13c. In the example, the encoder determines a second hash value h'($B_{current}$)=$h'_0$ for the current block, and selects the list for $h'_0$ from the list (1310). For the candidate blocks in the list for $h'_0$, the encoder can perform sample-wise block matching to select a matching block. In this example, the lists for the second hash values are specific to a given list for the first hash value. Alternatively, there is one set of lists for the second hash values, and the encoder identifies any candidate blocks that are (1) in the matching list for the first hash values and also (2) in the matching list for the second hash values.

Aside from hash-based block matching, the second hash function h'( ) can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the iterative hash-based block matching and updating use two different hash functions. Alternatively, the encoder uses three, four or more hash functions to further speed up hash-based block matching or filter out non-identical blocks, and thereby reduce the number of sample-wise block matching operations. Also, for a low-complexity encoder, the encoder can skip sample-wise block matching operations when hash values match. For hash functions with a large number of possible hash values, there is a high probability that two blocks are identical if all hash values for the two blocks match.

E. Skipping Encoding Stages Based on Results of Hash-Based Block Matching.

This section presents various ways to speed up encoding when hash-based block matching is used.

Figure 14:
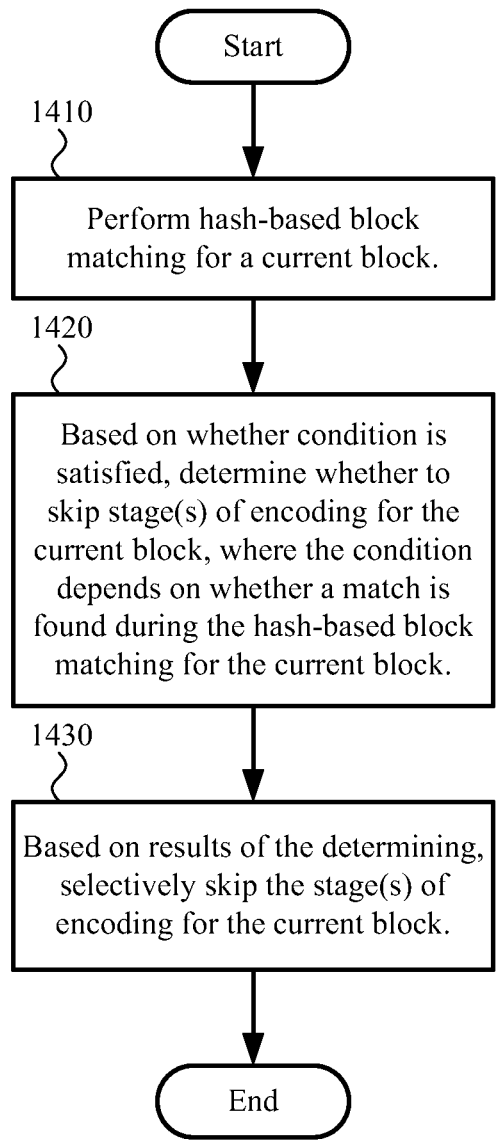
FIGS. 14 and 15 are flowcharts illustrating techniques for selectively skipping one or more stages of encoding depending on results of hash-based block matching.

FIG. 14 illustrates a generalized technique (1400) for selectively skipping one or more stages of encoding depending on results of hash-based block matching. An image encoder or video encoder such as one described with reference to FIG. 3 or FIGS. 4a-4b can perform the technique (1400).

The encoder encodes an image or video to produce encoded data, which the encoder outputs as part of a bitstream. During the encoding, the encoder performs (1410) hash-based block matching for a current block of a current picture. For example, the encoder performs hash-based block matching using one of the data structures described above. The hash-based block matching can include some sample-by-sample block matching operations, to confirm that a current block matches a candidate block after their hash values match.

The encoder checks whether a condition is satisfied. The condition depends on whether a match is found during the hash-based block matching for the current block. In general, a match in the hash-based block matching signifies matching hash values between the current block and a candidate block. It can also signify sample-by-sample matching between the current block and the candidate block.

The condition can also depend on other factors, such as (1) expected quality of the current block relative to quality of a candidate block for the match, (2) block size of the current block relative to a threshold block size, and/or (3) some other factor.

The expected quality of the current block can be indicated by a quantization parameter ("QP") value that applies for the current block, and the quality of the candidate block can be indicated by a QP value for the candidate block. If the candidate block covers parts of blocks that have different QP values, the QP value for the candidate block can be (a) a smallest QP value among the different QP values for the blocks, (b) a QP value of whichever block covers a largest portion of the candidate block, (c) an average QP value among the different QP values for the blocks, (d) a weighted average QP value among the different QP values for the blocks, (e) a largest QP value among the different QP values for the blocks, or (f) some other QP value derived from one or more of the different QP values for the blocks. In particular, as part of the condition, the encoder can check that the QP value for the current block is greater than or equal to the QP value for the candidate block. If the QP value for the current block is greater than or equal to the QP value for the candidate block, the expected error for the current block is equivalent to or worse than the expected error for the candidate block. Alternatively, instead of checking QP values for the current block and candidate block, the encoder evaluates residual values for the current block relative to the candidate block (e.g., checking energy in the residual values, counting non-zero frequency coefficients for the residual values after a frequency transform).

When the encoder compares the block size of the current block to a threshold block size, the threshold block size can be set to a block size at or above which the encoder has confidence in the skipping decision. In general, the encoder is more confident in the skipping decision for larger blocks, and less confident in the skipping decision for smaller blocks. For example, the threshold block size can be 64×64, 32×32 or some other block size.

Based on whether the condition is satisfied, the encoder determines (1420) whether to skip one or more stages of encoding for the current block. Then, based on results of that determination (1420), the encoder selectively skips (1430) the stage(s) of encoding for the current block.

For example, the hash-based block matching for the current block is performed for motion estimation (with hash values computed from input sample values), and the encoder selectively skips fractional-precision motion estimation for the current block. In some example implementations, the encoder performs hash-based block matching to find a matching, candidate block at an integer-sample offset in a reference picture. If the hash-based block matching process finds a match in the reference picture, the encoder skips fractional-sample motion estimation (e.g., at ½-sample offsets and/or ¼-sample offsets in the reference picture). This saves computational resources that would otherwise be used for interpolation of fractional sample values and sample-by-sample comparisons of values during the fractional-precision motion estimation. As part of the condition, the encoder can also check QP values for the current block and candidate block, block size for the current block and/or another factor.

As another example, the hash-based block matching for the current block is performed for motion estimation (with hash values computed from input sample values), and the encoder selectively skips evaluation of coding modes and coding options for the current block (e.g., all evaluation of coding modes and coding options after the hash-based block matching). In some example implementations, if the encoder finds a matching, candidate block in a reference picture using hash-based block matching, the encoder may terminate encoding for the current block, which significantly decreases encoding time. For the skipping condition, the encoder can also check that the reconstructed quality of the candidate block in the reference picture is no worse than the expected reconstructed quality of the current block (e.g., by comparing the QP value, average QP value, weighted average QP value, smallest QP value, etc. for the candidate block with the QP value that will be used for the current block) and check that the block size of the current block is greater than or equal to a threshold block size (e.g., 64×64). Alternatively, the encoder skips some but not all evaluation of coding modes and coding options when the condition is satisfied.

As another example, the hash-based block matching for the current block is performed for block vector estimation (with hash values computed from input sample values), and the encoder selectively skips evaluation of intra-picture coding modes and coding options for the current block (e.g., all evaluation of intra-picture coding modes and coding options after the hash-based block matching). In some example implementations, when no match is found in a reference picture through hash-based block matching (for motion estimation), if the encoder finds a matching, candidate block in the current picture using hash-based block matching (for BV estimation), the encoder may terminate encoding for the current block, which significantly decreases encoding time. As part of the condition, the encoder can also check QP values for the current block and candidate block, block size for the current block and/or another factor.

Figure 15:
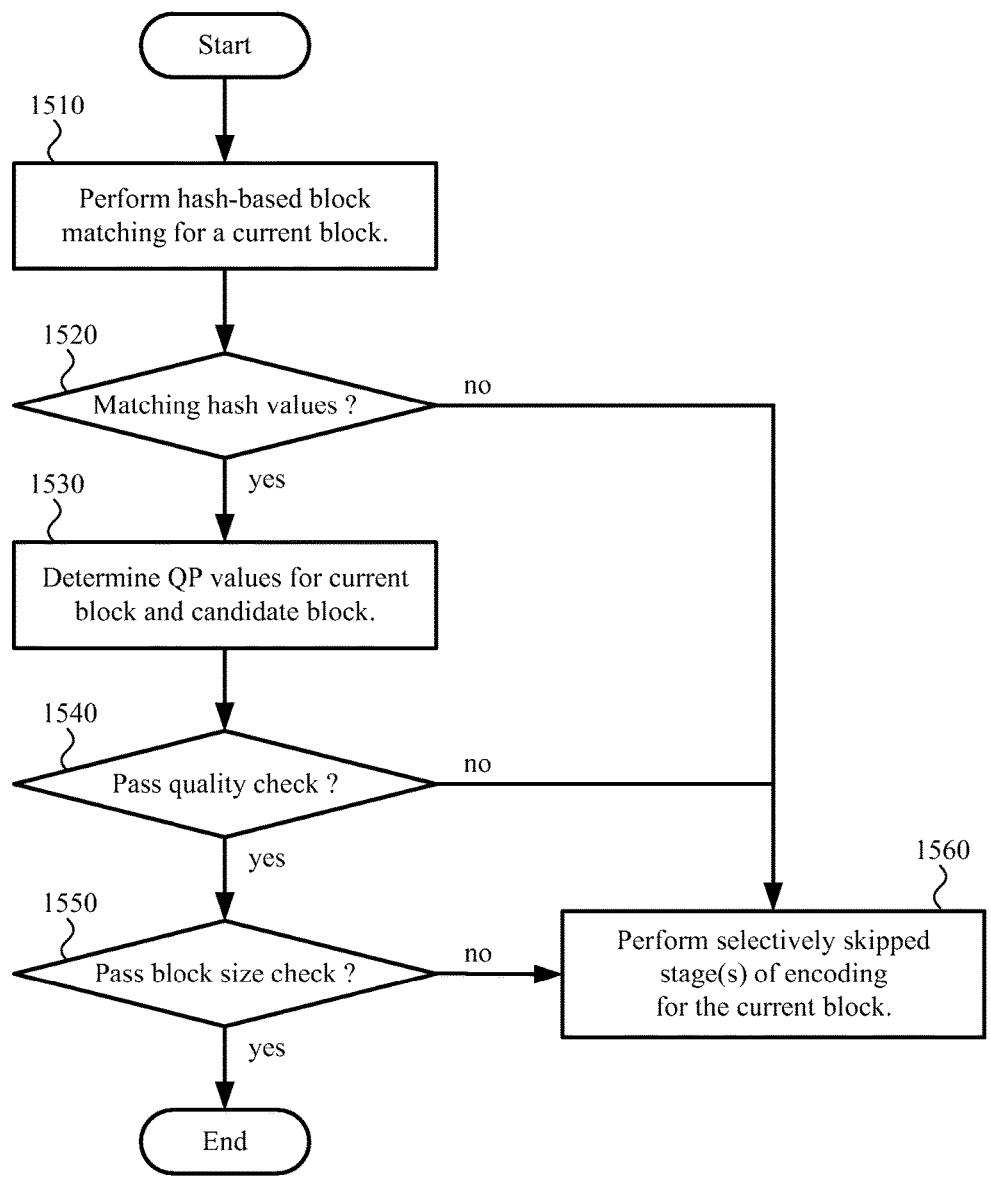

FIG. 15 illustrates a more detailed example technique (1500) for selectively skipping one or more stages of encoding depending on results of hash-based block matching. An image encoder or video encoder such as one described with reference to FIG. 3 or FIGS. 4a-4b can perform the technique (1500).

During encoding, the encoder selectively skips one or more stages of encoding for a current block of a current picture. The encoder performs (1510) hash-based block matching for the current block. For example, the encoder performs hash-based block matching using one of the data structures described above, as part of motion estimation or block vector estimation. The hash-based block matching can include some sample-by-sample block matching operations, to confirm that a current block matches a candidate block after their hash values match.

The encoder checks (1520) if hash-based block matching yields a match for the current block. If the hash-based block matching yields a match, the encoder determines (1530) QP values for the current block and the candidate block, then determines (1540) whether the candidate block passes a quality check (e.g., expected quality of the current block is no better than the reconstruction quality of the candidate block). If so, the encoder determines (1550) whether the current block passes a block size check (e.g., block size of the current block is greater than or equal to a threshold block size). If all three checks (1520, 1540, 1550) are passed, the encoder skips the stage(s) of encoding. Otherwise, if any of the three checks (1520, 1540, 1550) fails, the encoder performs (1560) the selectively skipped stage(s) of encoding.

VII. Selectively Skipping Intra-Picture Prediction Modes.

This section presents various ways to identify when certain intra-picture prediction modes should or should not be evaluated during encoding, which can speed up encoding. In particular, certain intra-picture prediction modes are adapted for screen capture content or other artificially created video. By providing a high-probability way to detect artificially created video, the encoder can evaluate such intra-picture prediction modes when they are likely to be effective (e.g., for screen capture video or other artificially created video), and skip those modes when they are likely to be ineffective (e.g., for natural video).

Figure 16:
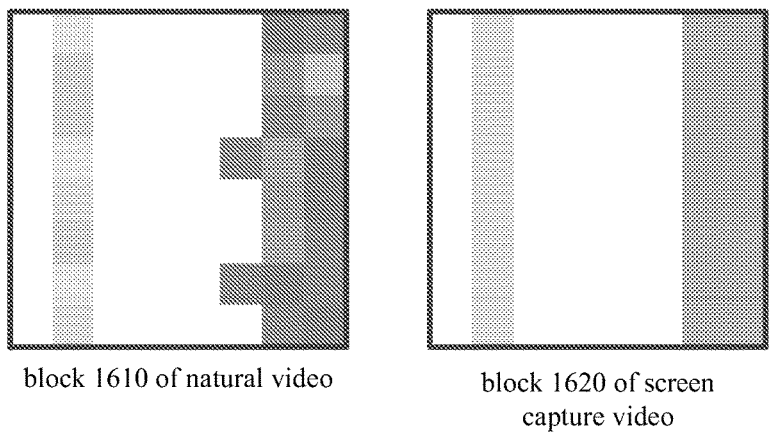
FIG. 16 is a diagram illustrating characteristics of blocks of natural video and screen capture video.

FIG. 16 shows characteristics of typical blocks of natural video and screen capture video, which depict the same general pattern. The block (1610) of natural video includes gradually changing sample values and irregular lines. In contrast, the block (1620) of screen capture video includes sharper lines and patterns of uniform sample values. Also, the number of different color values varies between the block (1610) of natural video and block (1620) of screen capture video. The block (1620) of screen capture video includes three colors, and the block (1610) of natural video includes many more different colors.

Figure 17:
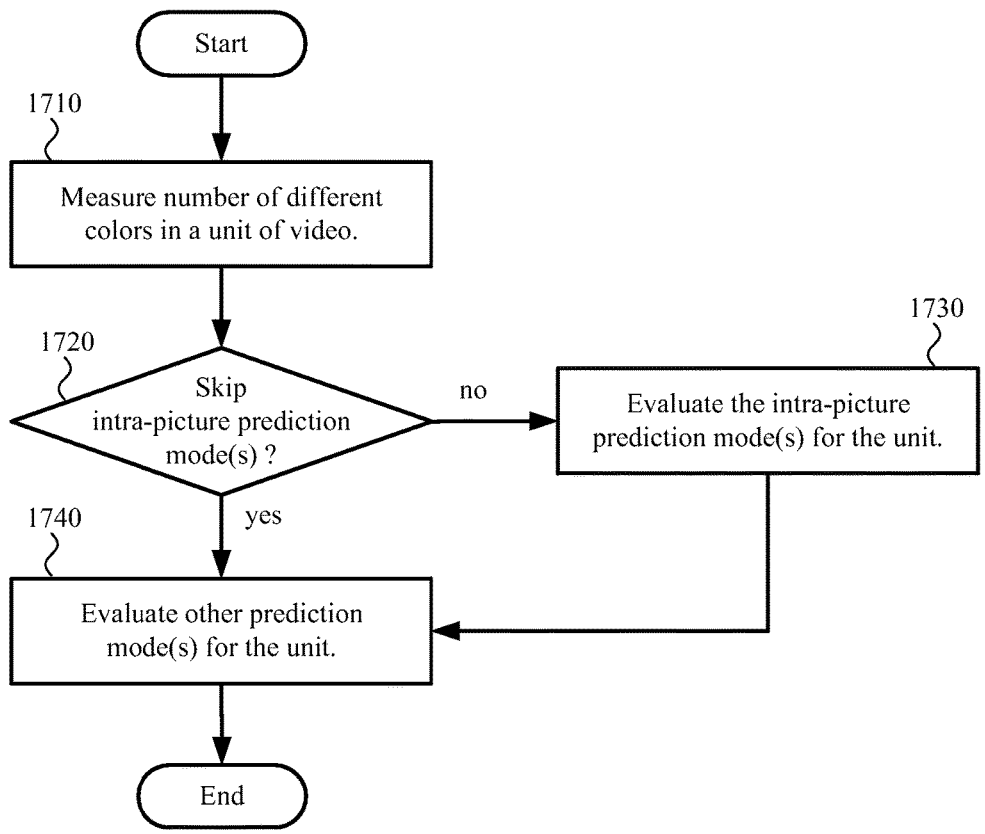
FIG. 17 is a flowchart illustrating a generalized technique for selectively skipping evaluation of one or more intra-picture prediction modes depending on a measure of the number of different colors in a unit of video.

FIG. 17 shows a generalized technique (1700) for selectively skipping evaluation of one or more intra-picture prediction modes depending on a measure of the number of different colors in a unit of video. An image encoder or video encoder such as one described with reference to FIG. 3 or FIGS. 4a-4b can perform the technique (1700).

The encoder encodes an image or video to produce encoded data, which the encoder outputs as part of a bitstream. During the encoding, the encoder measures (1710) the number of different colors in a unit (e.g., block, slice, picture) of the image or video. For example, the encoder counts the distinct colors among sample values in the unit. Or, the encoder counts the distinct colors among sample values in the unit after clustering of the sample values into fewer colors (e.g., quantizing the sample values such that similar sample values become the same sample value). Or, the encoder measures the number of different colors in the unit in some other way.

The way the encoder measures the number of different colors depends on the color space used. If the color space is YUV (e.g., YCbCr, YCoCg), for example, the encoder can count different Y values in the unit of video. Or, the encoder can count different YUV triplets (that is, distinct combinations of Y, U and V sample values for pixels at locations). If the color space is RGB (or GBR or BGR), the encoder can count sample values in one color component or multiple color components. Or, the encoder can count different triplets (that is, distinct combinations of R, G and B sample values for pixels at locations).

Based at least in part on results of the measuring, the encoder determines (1720) whether to skip one or more intra-picture prediction modes for the unit. For example, the intra-picture prediction modes include intra BC prediction mode and/or intra-picture dictionary mode. To determine whether to skip the intra-picture prediction mode(s), the encoder can compare the results of the measuring to a threshold count.

The value of the threshold count depends on implementation and can be, for example, 5, 10, 20, or 50. The threshold count can be the same for all sizes of units (e.g., regardless of block size). Or, the threshold count can be different for different unit sizes (e.g., different block sizes). The threshold can be pre-defined and static, or the threshold can be adjustable (tunable). For example, before the encoding the image or video, the threshold can be adjusted by a user or an application to trade off encoding speed versus decrease in coding efficiency. (Generally, lowering the threshold increases encoding speed by skipping the intra-picture mode(s) for more blocks, but may cause a drop in coding efficiency when using the skipped mode(s) would have been effective.

If the intra-picture prediction mode(s) are not skipped, the encoder evaluates (1730) the intra-picture prediction mode(s) for the unit. The encoder also evaluates (1740) one or more other prediction modes for the unit. If the intra-picture prediction mode(s) are skipped, the encoder only evaluates (1740) the other prediction mode(s) for the unit.

In some example implementations, an encoder selectively skips evaluation of intra BC prediction mode for a block, depending on the number of different colors in the block. Intra BC prediction is primarily designed for blocks of screen capture content and usually does not work well for natural video content. Typically, the number of different colors in a block of screen capture content is not large. Thus, if the number of different colors in a block is larger than a threshold count, the encoder skips evaluation of intra BC prediction mode for the block, which tends to improve encoding speed.

In some example implementations, an encoder selectively skips evaluation of dictionary mode for a block, depending on the number of different colors in the block. Dictionary mode often works well for blocks of screen capture content but rarely works so well for natural video content. Thus, if the number of different colors in a block is larger than a threshold count, the encoder skips evaluation of dictionary mode for the block, which tends to improve encoding speed.

VIII. Encoder-Side Decisions for a Block in Spatial Intra-Picture Prediction Mode.

This section presents various ways to perform encoding decisions for a block encoded using spatial intra-picture prediction. Such blocks are common in natural video and artificially created video.

FIG. 18 shows example directions (1800) of spatial intra-picture prediction for a block according to the H.265/HEVC standard. The directions include 33 angled directions and two null directions (a DC prediction mode and a planar prediction mode). For some types of blocks, all 35 directions are available. For other types of blocks, a subset of the directions is available. For other standards or formats, an encoder can use different spatial prediction directions.

Evaluating different spatial prediction directions for a current block (and making other coding decisions for the block) can be very time-consuming, considering the number of different options. In one previous approach, an H.265/HEVC encoder performs a three-stage process to make the decisions. First, the encoder gets the best n spatial prediction directions, where n is 2, 3, or some other count that depends on implementation. The encoder ranks the spatial prediction directions according to sum of absolute transform differences ("SATD"), which is a measure of distortion based on the residual values that result when a spatial prediction direction is used. The encoder may check whether the most probable modes ("MPMs") are represented in the best n spatial prediction directions. If not, the encoder can increase n and add any missing MPMs to the set of the best n spatial prediction directions.

Next, for the n best prediction directions, the encoder selects the best prediction direction according to rate-distortion optimization ("RDO") when the transform size (for residual values) is the largest transform size. In this stage, the encoder uses rate-distortion optimized quantization ("RDOQ"), which is very time-consuming. With RDOQ, the encoder sets the optimal quantization level for each coefficient, adaptively tweaking coefficient values based on rate-distortion efficiency. For example, for a given prediction direction, the encoder determines residual values, performs frequency transform with the largest transform size, quantizes coefficients using RDOQ, entropy codes the quantized coefficients, reconstructs the residual values, and measures distortion cost and rate cost. The encoder repeats that process for each of the other n prediction directions.

Finally, for the selected prediction direction, the encoder performs RDO with RDOQ when determining transform sizes for residual values. The residual values are organized as a residual quadtree ("RQT"). FIG. 19 shows example organizations (1901 . . . 1908) for a RQT, which differ in terms of how blocks of residual values are organized for frequency transforms. Many other possible organizations for the RQT are not shown. For example, for an organization of RQT, the encoder applies spatial prediction to a transform block in the selected prediction direction, calculates residual values, performs a frequency transform on the residual values for the transform block, quantizes coefficients using RDOQ, entropy codes the quantized transform coefficients, and reconstructs the values of the transform block (with inverse quantization and inverse transform). The encoder repeats that process for any other transform blocks of the current block, then measures distortion cost and rate cost. The encoder repeats that process for each of the other evaluated RQT options, and selects the best RQT option.

Figure 20:
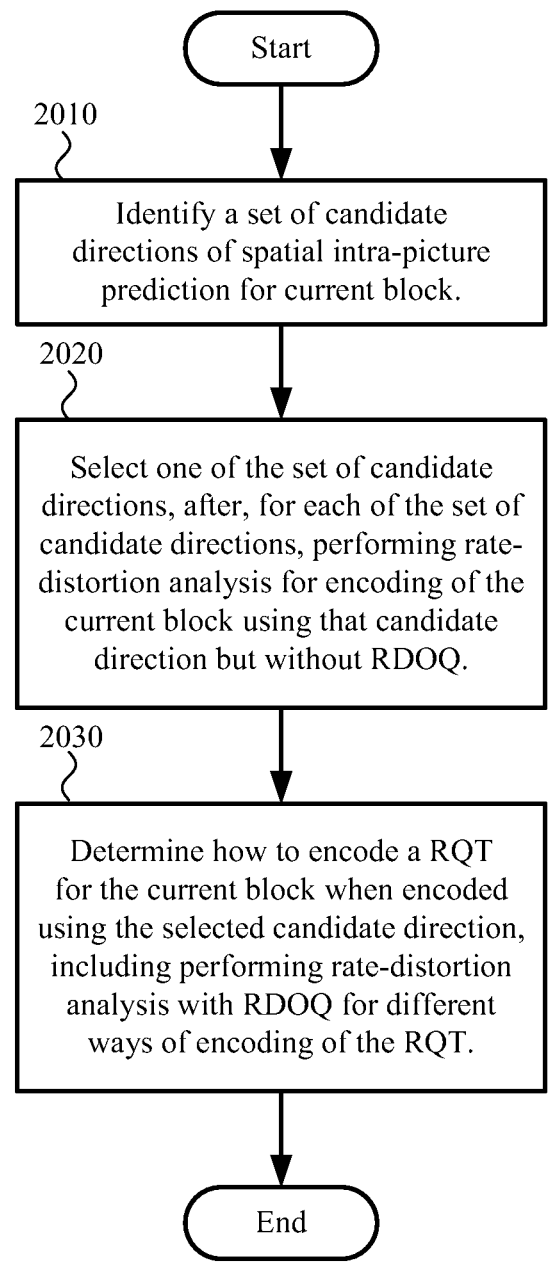
FIG. 20 is a flowchart illustrating an example technique for making encoding decisions for a block encoded with spatial intra-picture prediction.

FIG. 20 illustrates an example technique (2000) for making encoding decisions for a block encoded with spatial intra-picture prediction. The technique (2000) is significantly faster than the previous approach, in many scenarios, and still provides good coding efficiency for blocks encoded using spatial intra-picture prediction. An image encoder or video encoder such as one described with reference to FIG. 3 or FIGS. 4a-4b can perform the technique (2000).

The encoder encodes an image or video to produce encoded data, which the encoder outputs as part of a bitstream. During the encoding, for a current block of a current picture, in a first stage the encoder identifies (2010) a set of candidate directions of spatial intra-picture prediction for the current block. For example, for each of multiple possible directions of spatial intra-picture prediction for the current block, the encoder calculates a value of a distortion metric (such as SAD or SATD) for the possible direction. Then, the encoder selects the set of candidate directions according to the values of the distortion metric for the multiple possible directions. The encoder may check whether the MPMs are represented in the set of candidate directions. If not, the encoder can add any missing MPMs to the set of candidate directions.

In a second stage, the encoder selects (2020) one of the set of candidate directions. In particular, for each candidate direction of the set of candidate directions, the encoder performs rate-distortion analysis for encoding of the current block using that candidate direction but without RDOQ. By omitting RDOQ, the second stage is much faster than the second stage in the previous approach, which can significantly reduce overall encoding time. For example, for each candidate direction of the set of candidate directions, the encoder (a) calculates residual values for the current block when encoded using the candidate direction, (b) encodes the residual values using a largest transform size but without RDOQ, (c) reconstructs the residual values, and (d) measures rate cost and distortion cost. The encoder then selects the candidate direction with the lowest cost.

In a third stage, the encoder determines (2030) how to encode the RQT for the current block when the block is encoded using the selected candidate direction. In this stage, the encoder performs rate-distortion analysis with RDOQ for different ways of encoding of the RQT. For example, for each of multiple combinations of transform sizes for the RQT, the encoder encodes residual values of the RQT using the combination of transform sizes with RDOQ. The encoder then selects the RQT combination with the lowest cost.

IX. Skipping Transform Mode for Intra-BC-Predicted Blocks.

This section presents various ways to identify when transform mode should or should not be evaluated during encoding, which can speed up encoding. Certain coding options such as transform skip mode are adapted for screen capture content or other artificially created video. The encoder can favor such coding options when they are likely to be effective (e.g., for screen capture video or other artificially created video) and disable other, conflicting coding options that are likely to be ineffective. Like transform skip mode, intra BC prediction mode is adapted for screen capture content or other artificially created video.

Figure 21:
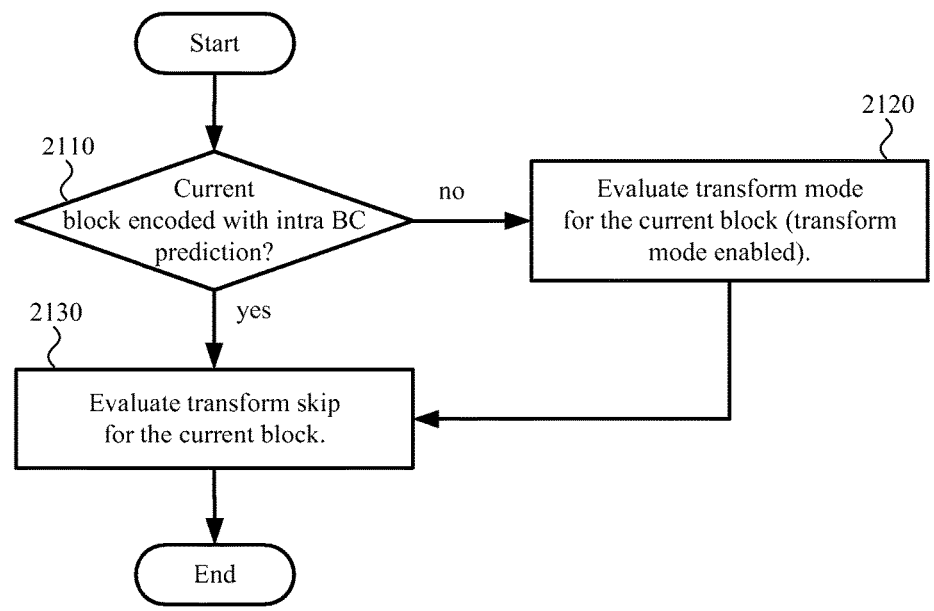
FIG. 21 is a flowchart illustrating a generalized technique for selectively skipping transform mode for a block encoded with intra BC prediction.

FIG. 21 shows a generalized technique (2100) for selectively skipping transform mode for a block encoded with intra BC prediction. An image encoder or video encoder such as one described with reference to FIG. 3 or FIGS. 4a-4b can perform the technique (2100).

The encoder encodes an image or video to produce encoded data, which the encoder outputs as part of a bitstream. During the encoding, the encoder checks (2110) whether a current block of a current picture is encoded using intra BC prediction. Depending on whether the current block is encoded using intra BC prediction, the encoder enables or disables transform mode for the current block. For example, the transform mode includes a frequency transform, quantization and entropy coding, whereas the transform skip mode lacks a frequency transform but includes quantization and entropy coding.

The encoder then encodes the current block. If the current block is not encoded using intra BC prediction, the encoder evaluates (2120) transform mode for the current block (transform block is enabled) and also evaluates (2130) transform skip mode for the current block. On the other hand, if the current block is encoded using intra BC prediction, the encoder skips the evaluation of the transform mode but still evaluates (2130) transform skip mode for the current block. Alternatively, if the current block is encoded using intra BC prediction, the encoder automatically selects the transform skip mode without evaluation of the transform skip mode.

This section describes encoder-side decisions that avoid evaluation of transform mode for intra-BC-predicted blocks. The encoder-side decisions do not affect bitstream syntax (e.g., signaling of transform skip flags). Alternatively, bitstream syntax can be altered (e.g., at block level) to avoid signaling of transform skip flags for intra-BC-predicted blocks. In this variation, intra-BC-predicted blocks are assumed to use transform skip mode. An encoder may signal a transform skip flag for a non-intra-BC-predicted block, but does not signal a transform skip flag for an intra-BC-predicted block. A decoder parses a transform skip flag for a non-intra-BC-predicted block, but does not parse a transform skip flag for an intra-BC-predicted block, which is assumed to use transform skip mode.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising:
   one or more buffers configured to store an image or video, the image or video including a current picture; and
   an image encoder or video encoder configured to perform operations comprising:
      encoding the image or video to produce encoded data, including:
         performing hash-based block matching for a current block of the current picture;
         based on whether a condition is satisfied, determining whether to skip one or more stages of encoding for the current block, wherein the condition depends on multiple factors being satisfied, the multiple factors including:
            a match factor that is satisfied if a match is found during the hash-based block matching for the current block; and
            a block size factor that is satisfied if block size of the current block is at least equal to a threshold block size; and
         based on results of the determining, selectively skipping the one or more stages of encoding for the current block; and
      outputting the encoded data in a bitstream.

2. The computing device of claim 1 wherein the hash-based block matching for the current block is performed for motion estimation, and wherein the one or more stages of encoding for the current block include fractional-precision motion estimation for the current block, evaluation of coding modes for the current block, and/or evaluation of coding options for the current block.

3. The computing device of claim 1 wherein the hash-based block matching for the current block is performed for block vector estimation, and wherein the one or more stages of encoding for the current block include evaluation of coding modes and coding options for the current block.

4. The computing device of claim 1 wherein the multiple factors further include a quality factor that is satisfied if quality of a candidate block for the match is no worse than expected quality of the current block.

5. The computing device of claim 4 wherein the expected quality of the current block is indicated by a quantization parameter ("QP") value that applies for the current block, wherein the quality of the candidate block is indicated by a QP value for the candidate block, and wherein the quality factor is satisfied if the QP value for the candidate block is less than or equal to the QP value for the current block.

6. The computing device of claim 1 wherein the match signifies matching hash values between the current block and a candidate block.

7. The computing device of claim 6 wherein the match further signifies sample-by-sample matching between the current block and the candidate block.

8. The computing device of claim 1 wherein the hash-based block matching compares hash values computed from input sample values.

9. In a computing device that implements an image encoder or video encoder, a method comprising:
   receiving an image or video, the image or video including a current picture;
   encoding the image or video to produce encoded data, including:
      performing hash-based block matching for a current block of the current picture;
      based on whether a condition is satisfied, determining whether to skip one or more stages of encoding for the current block, wherein the condition depends on multiple factors being satisfied, the multiple factors including:
         a match factor that is satisfied if a match is found during the hash-based block matching for the current block; and
         a quality factor that is satisfied if quality of a candidate block for the match is no worse than expected quality of the current block, wherein the expected quality of the current block is indicated by a quantization parameter ("QP") value that applies for the current block, wherein the quality of the candidate block is indicated by a QP value for the candidate block, and wherein the quality factor is satisfied if the QP value for the candidate block is less than or equal to the QP value for the current block; and
      based on results of the determining, selectively skipping the one or more stages of encoding for the current block; and
   outputting the encoded data in a bitstream.

10. The method of claim 9 wherein the hash-based block matching for the current block is performed for motion estimation, and wherein the one or more stages of encoding for the current block include fractional-precision motion estimation for the current block, evaluation of coding modes for the current block, and/or evaluation of coding options for the current block.

11. The method of claim 9 wherein the hash-based block matching for the current block is performed for block vector estimation, and wherein the one or more stages of encoding for the current block include evaluation of coding modes and coding options for the current block.

12. The method of claim 9 wherein the multiple factors further include a block size factor that is satisfied if block size of the current block is at least equal to a threshold block size.

13. The method of claim 9 wherein the match signifies:
matching hash values between the current block and the candidate block; and
sample-by-sample matching between the current block and the candidate block.

14. The method of claim 9 wherein the hash-based block matching compares hash values computed from input sample values.

15. One or more computer-readable memory or storage devices having stored thereon computer-executable instructions for causing a computing device, when programmed thereby, to perform operations comprising:
receiving an image or video, the image or video including a current picture;
encoding the image or video to produce encoded data, including:
performing hash-based block matching for a current block of the current picture as part of motion estimation relative to candidate blocks in one or more reference pictures other than the current picture;
determining whether a match is found during the hash-based block matching for the current block as part of the motion estimation;
when a match is found during the hash-based block matching for the current block as part of the motion estimation, skipping one or more stages of encoding for the current block;
when no match is found during the hash-based block matching for the current block as part of the motion estimation, performing hash-based block matching for the current block as part of block vector estimation relative to candidate blocks in the current picture;
based on whether a condition is satisfied, determining whether to skip the one or more stages of encoding for the current block, wherein the condition depends on one or more factors being satisfied, the one or more factors including a match factor that is satisfied if a match is found during the hash-based block matching for the current block; and
based on results of the determining whether to skip, selectively skipping the one or more stages of encoding for the current block; and
outputting the encoded data in a bitstream.

16. The one or more computer-readable memory or storage devices of claim 15 wherein the one or more factors further include a quality factor that is satisfied if quality of a candidate block for the match is no worse than expected quality of the current block.

17. The one or more computer-readable memory or storage devices of claim 16 wherein the expected quality of the current block is indicated by a quantization parameter ("QP") value that applies for the current block, wherein the quality of the candidate block is indicated by a QP value for the candidate block, and wherein the quality factor is satisfied if the QP value for the candidate block is less than or equal to the QP value for the current block.

18. The one or more computer-readable memory or storage devices of claim 15 wherein the one or more factors further include a block size factor that is satisfied if block size of the current block is at least equal to a threshold block size.

19. The one or more computer-readable memory or storage devices of claim 15 wherein the match signifies:
matching hash values between the current block and a candidate block for the match; and
sample-by-sample matching between the current block and the candidate block for the match.

20. The one or more computer-readable memory or storage devices of claim 15 wherein the hash-based block matching compares hash values computed from input sample values.

* * * * *